United States Patent
Yoshida

(10) Patent No.: US 11,404,221 B2
(45) Date of Patent: Aug. 2, 2022

(54) ELECTROLYTIC CAPACITOR MODULE, FILTER CIRCUIT AND POWER CONVERTER

(71) Applicant: NIPPON CHEMI-CON CORPORATION, Tokyo (JP)

(72) Inventor: Atsushi Yoshida, Tokyo (JP)

(73) Assignee: NIPPON CHEMI-CON CORPORATION, Tokyo (JP)

(*) Notice: Subject to any disclaimer, the term of this patent is extended or adjusted under 35 U.S.C. 154(b) by 216 days.

(21) Appl. No.: 16/762,346

(22) PCT Filed: Nov. 21, 2018

(86) PCT No.: PCT/JP2018/042917
§ 371 (c)(1),
(2) Date: May 7, 2020

(87) PCT Pub. No.: WO2019/103021
PCT Pub. Date: May 31, 2019

(65) Prior Publication Data
US 2021/0183586 A1 Jun. 17, 2021

(30) Foreign Application Priority Data
Nov. 22, 2017 (JP) .............................. JP2017-224889

(51) Int. Cl.
*H01G 9/055* (2006.01)
*H01G 9/26* (2006.01)
(Continued)

(52) U.S. Cl.
CPC ............... *H01G 9/055* (2013.01); *H01G 9/26* (2013.01); *H02M 1/14* (2013.01); *H02M 7/5387* (2013.01); *H02P 27/06* (2013.01)

(58) Field of Classification Search
CPC ............. H01G 9/055; H01G 9/26; H01G 9/28
See application file for complete search history.

(56) References Cited

U.S. PATENT DOCUMENTS 3,976,922 A * 8/1976 Peck .................... H01G 9/08
361/434
6,736,956 B1 * 5/2004 Hemphill ............... C25D 3/08
205/640
(Continued)

FOREIGN PATENT DOCUMENTS

CN 1476165 A 2/2004
CN 107852102 A 3/2018
(Continued)

OTHER PUBLICATIONS

Office Action dated Apr. 2, 2021, issued in counterpart CN Application No. 201880068882.1, with English Translation. (17 pages).
(Continued)

*Primary Examiner* — David M Sinclair
(74) *Attorney, Agent, or Firm* — WHDA, LLP

(57) ABSTRACT

An electrolytic capacitor module includes at least two types of electrolytic capacitors (4-1, 4-2) having etching pits in electrode foils. The at least two types of electrolytic capacitors (4-1, 4-2) are different in length of the etching pits and are connected in parallel. The number of electrolytic capacitors to be mounted is the same or different. The electrolytic capacitors (4-1, 4-2) are each an electrolytic capacitor with an etching pit length of 27 [μm] or less or an electrolytic capacitor with an etching pit length over 27 [μm]. Such a configuration enhances performance of the electrolytic capacitors in a high-frequency region, keeps a rate of decrease in capacitance low in the high-frequency region, and enhances a ripple current capability in the high-frequency region.

3 Claims, 19 Drawing Sheets

(51) Int. Cl.
    *H02M 1/14*     (2006.01)
    *H02M 7/5387*     (2007.01)
    *H02P 27/06*     (2006.01)

(56) References Cited

U.S. PATENT DOCUMENTS

| | | | |
|---|---|---|---|
| 11,183,338 B2 * | 11/2021 | Stockman | H01G 4/232 |
| 2004/0021528 A1 | 2/2004 | Arai et al. | |
| 2008/0285210 A1 * | 11/2008 | Oh | H01G 9/15 29/25.03 |
| 2013/0233605 A1 | 9/2013 | Hsu et al. | |
| 2014/0268502 A1 * | 9/2014 | Biler | H01G 9/052 205/207 |
| 2018/0159439 A1 | 6/2018 | Mukunoki et al. | |

FOREIGN PATENT DOCUMENTS

| | | |
|---|---|---|
| JP | 57-48221 A | 3/1982 |
| JP | 2004-80773 A | 3/2004 |
| JP | 2005-217129 A | 8/2005 |
| JP | 2006-169571 A | 6/2006 |
| JP | 2007-115949 A | 5/2007 |
| JP | 2015-204721 A | 11/2015 |
| WO | 2017/014143 A1 | 1/2017 |

OTHER PUBLICATIONS

Office Action dated Nov. 2, 2021 issued in counterpart JP Patent Application No. 2017-224889, with English Translation. (6 pages).
International Search Report dated Feb. 12, 2019, issued in counterpart International Application No. PCT/JP2018/042917, with English Translation. (5 pages).
Written Opinion of the International Searching Authority (Form PCT/ISA/237) dated Feb. 12, 2019, issued in counterpart International Application No. PCT/JP2018/042917 (5 pages).
Notification Concerning Transmittal of International Preliminary Report on Patentability (Forms PCT/IB/326) Issued in counterpart International Application No. PCT/JP2018/042917 dated Jun. 4, 2020 with Forms PCT/IB/373, PCT/IB/338 and PCT/ISA/237. (12 pages).
Extended (Supplementary)European Search Report dated Aug. 2, 2021, issued in counterpart EP Application No. 18881070.9. (6 pages).
Office Action dated Aug. 30, 2021, issued in counterpart CN Application No. 201880068882.1, with English Translation. (13 pages).
Office Action dated Apr. 1, 2022, issued in counterpart CN application No. 201880068882.1, with English translation. (6 pages).
Office Action dated Mar. 18, 2022, issued in counterpart TW application No. 107141503, with English translation. (7 pages).

* cited by examiner

| Sample No. | Tunnel length [μm] | Foil thickness [μm] | Capacitance [μF/cm²] |
|---|---|---|---|
| (1) | 55 | 125 | 0.634 |
| (2) | 48 | | 0.601 |
| (3) | 42 | | 0.540 |
| (4) | 33 | | 0.459 |
| (5) | 27 | | 0.393 |

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Pit length ($\mu$m) | | | 27 | 20 | 12 | 6 | 55 | 48 | 42 | 33 |
| Frequency (Hz) | | | 120 / 100K | 120 / 100K | 120 / 100K | 120 / 100K | 120 / 100K | 120 / 100K | 120 / 100K | 120 / 100K |
| Capacitance ($\mu$F) | First measurement | | 1.39 / 0.94 | — / — | — / — | — / — | 2.50 / 1.07 | 2.26 / 1.06 | 2.08 / 1.09 | 1.74 / 1.03 |
| | Second measurement | | 1.51 / 1.00 | — / — | — / — | — / — | 2.47 / 1.04 | 2.19 / 1.10 | 1.98 / 0.92 | 1.70 / 0.94 |
| | Third measurement | | 1.45 / 0.96 | — / — | — / — | — / — | 2.53 / 1.16 | 2.28 / 1.00 | 2.03 / 1.19 | 1.67 / 1.03 |
| | Average | | 1.45 / 0.97 | 1.02 / 0.83 | 0.51 / 0.42 | 0.21 / 0.19 | 2.50 / 1.09 | 2.24 / 1.05 | 2.03 / 1.07 | 1.70 / 1.00 |

ELECTROLYTIC CAPACITOR MODULE, FILTER CIRCUIT AND POWER CONVERTER

TECHNICAL FIELD

The present disclosure relates to modularization technology and circuit technology of electrolytic capacitors specified by electrode foils with different etching pit lengths.

BACKGROUND ART

Power conversion between DC and AC employs a power converter such as an inverter or a converter that converts power by switching. The power converter includes a filter provided with capacitors for removing high-frequency components generated by switching.

It is known in use that, in the filter, a high-capacity capacitor having a large high-frequency loss and a low-capacity capacitor having a small high-frequency loss are connected in parallel (Patent Literature 1). Patent Literature 1 describes the large loss in an aluminum electrolytic capacitor but does not describe the use of electrolytic capacitors for parallelization of capacitors.

CITATION LIST

Patent Literature

Patent Literature 1: JP 2015-204721 A

SUMMARY OF INVENTION

Technical Problem

SiC and GaN are known as examples of semiconductor materials having a wide band gap. As next-generation power devices that employ such semiconductor materials, metal oxide semiconductor field effect transistors (MOSFET) and insulated gate bipolar transistors (IGBT) are attracting attention. These power devices have gone through the research phase and moved on to the practical phase. The power devices are contributing to higher performance of power source systems.

These power devices have features such as low on-resistance, high-speed switching and ability to operate under high temperatures as compared with power devices including silicon as in the related art. Since low on-resistance and high-speed switching prevent power loss, the use of such power devices to power converters enables high efficiency. Accordingly, the power devices that employ the semiconductor materials serve to simplify cooling parts such as a cooling fan and a heat sink, to downsize passive parts due to higher frequencies, and to reduce costs and save energy.

An electrolytic capacitor, a key part of a power converter, is closely related to downsizing and high efficiency of the power converter. Electrolytic capacitors have problems that remain to be solved such as high-speed switching characteristics, responsiveness at high frequencies and reduction in loss. In an electrolytic capacitor, a high capacitance density is obtained in a low-frequency region of about 300 [Hz] or less. This is a unique advantage not shared with other capacitors such as film capacitors and multi-layer ceramic capacitors (MLCC). However, electrolytic capacitors still have problems to be solved. For example, in a high-frequency region of several tens [kHz] or more, a rate of decrease in capacitance and equivalent series resistance (ESR) become high, and a ripple current capability is poor (permissible ripple current cannot be increased).

In order to achieve required capacitance in a high-frequency region and a required ripple current capability with an electrolytic capacitor, it is necessary to choose a large-sized electrolytic capacitor. Using a large-sized electrolytic capacitor makes it difficult to downsize a power converter and to reduce costs.

Capacitance depends on a surface area of an opposed electrode. In an electrolytic capacitor, an electrode foil is subjected to AC or DC etching in order to increase (to expand) a surface area of the electrode foil. In an electrode foil for low voltage, sponge-like etching pits are formed in a surface of the electrode foil by AC etching. In an electrode foil for high voltage, tunnel-like etching pits are formed in a surface of the electrode foil by DC etching. When a pit length is increased until an etching pit reaches a deep part of an electrode foil, a surface area of the electrode foil expands, which theoretically increases capacitance.

However, in digital equipment where information processing is generalized in a high-frequency region of 100 [kHz] or more, when the use of an electrolytic capacitor is expanded from a low-frequency region to a high-frequency region, capacitor performance in the high-frequency region emerges as a problem.

Focusing on frequency dependence of an electrode foil provided with tunnel-like etching pits, the present inventor has performed an equivalent circuit simulation and an experimental study of the tunnel-like etching pits in the electrode foil and has studied transient phenomena of the etching pits in a vertical direction of the electrode foil during high-speed switching.

Based on such study, the inventor has found out the following knowledge.

(1) An increase of a rate of decrease in capacitance and an increase of ESR in a high-frequency region are attributed to etching pit lengths. Furthermore, an increase of a rate of decrease in capacitance and an increase of ESR in a high-frequency region degrade responsiveness of high-speed switching at a deep part of a pit and the deep part does not contribute to generation of capacitance in the high-frequency region.

(2) Increasing a length (depth) of an etching pit contributes to generation of capacitance in a low-frequency region but does not contribute to generation of capacitance in a high-frequency region.

(3) When a pit length is made short and an electrode foil is made thin, an amount of electrode foils to be mounted increases by an amount of decrease in thickness of the electrode foil, as the size of an electrolytic capacitor does not change. The increased amount of electrode foils leads to an increase in capacitance.

(4) Comparing with an electrolytic capacitor having the same size, a rate of decrease in capacitance is small in a high-frequency region, which enhances a ripple current capability.

(5) When pit lengths are made different, it is possible to provide two types of electrolytic capacitors, that is, an electrolytic capacitor with high capacitance efficiency in a low-frequency region and an electrolytic capacitor with high capacitance efficiency in a high-frequency region.

(6) Two types of electrolytic capacitors enable excellent capacitor characteristics which cannot be obtained in a single electrolytic capacitor.

Patent Literature 1 does not disclose or suggest such problems, and a configuration disclosed in Patent Literature 1 cannot solve the problems.

A first object of a configuration of the present disclosure is to enhance performance of an electrolytic capacitor in a high-frequency region based on the above findings and knowledge.

A second object of the configuration of the present disclosure is to keep a rate of decrease in capacitance low in a high-frequency region and to enhance a ripple current capability in the high-frequency region.

Solution to Problem

In order to achieve the objects, according to an aspect of an electrolytic capacitor module of the present disclosure, an electrolytic capacitor module includes at least two types of electrolytic capacitors with different etching pit lengths, and the electrolytic capacitors are connected in parallel.

In the electrolytic capacitor module, the electrolytic capacitors may be each an electrolytic capacitor with an etching pit length of 27 [μm] or less or an electrolytic capacitor with an etching pit length over 27 [μm].

In order to achieve the objects, according to an aspect of a filter circuit of the present disclosure, a filter circuit includes an electrolytic capacitor module that includes at least two types of electrolytic capacitors with different etching pit lengths, and the electrolytic capacitors are connected in parallel.

In this filter circuit, the electrolytic capacitors may be each an electrolytic capacitor with an etching pit length of 27 [μm] or less or an electrolytic capacitor with an etching pit length over 27 [μm].

In order to achieve the objects, according to an aspect of a power converter of the present disclosure, a power converter includes a filter circuit provided with an electrolytic capacitor module that includes at least two types of electrolytic capacitors with different etching pit lengths, and the electrolytic capacitors are connected in parallel.

In this power converter, the electrolytic capacitors may be each an electrolytic capacitor with an etching pit length of 27 [μm] or less or an electrolytic capacitor with an etching pit length over 27 [μm].

Advantageous Effects of Invention

According to the present disclosure, any of the following effects is obtained.
<Electrolytic Capacitor Module>

(1) As to an electrolytic capacitor module provided with at least two electrolytic capacitors, an electrolytic capacitor module includes two types of electrolytic capacitors with different tunnel-like etching pit lengths. Accordingly, it is possible to generate capacitance with high efficiency in a wide frequency region from a low-frequency region to a high-frequency region.

(2) It is possible to reduce an electrode foil with a short pit length in thickness, to increase amount of a mounted foil due to thickness reduction, and to lead to an increase in capacitance in a high-frequency region due to increase of the amount of the foil. Simultaneously, an electrode foil with a long pit length can increase capacitance of an electrolytic capacitor in a low-frequency region. Such a configuration enables capacitor characteristics and highly efficient capacitance in a wide frequency region that cannot be obtained from a single electrolytic capacitor.

(3) In a high-frequency region, using an electrolytic capacitor that includes an electrode foil with a short pit length enhances responsiveness in a high-frequency region and supplements responsiveness of an electrolytic capacitor that includes an electrode foil with a long pit length.

(4) The combined use of an electrolytic capacitor provided with an electrode foil including tunnel-like etching pits with a long pit length and an electrolytic capacitor provided with an electrode foil with a short pit length makes it possible to achieve an electrolytic capacitor module suitable for a wide frequency region and to reduce the module in size and weight.

(5) In an electrolytic capacitor module provided with at least two electrolytic capacitors, every etching pit depth of an electrolytic capacitor with high capacitance efficiency in a high-frequency region contributes to capacitance. Accordingly, it is possible to make the electrolytic capacitor thin while leaving a sufficient amount of residual core. Furthermore, capacitance per unit volume of the electrolytic capacitor is enhanced while strength of an electrode foil is maintained.

(6) Even in an electrolytic capacitor that includes an electrode foil with a long pit length, increasing a foil area leads to generation of capacitance in a high-frequency region equivalent to capacitance in an electrolytic capacitor that includes an electrode foil with a short pit length. However, an increase in foil area increases a volume of an electrolytic capacitor greatly. An electrolytic capacitor module with such a large electrolytic capacitor cannot obtain capacitance equivalent to capacitance of an electrolytic capacitor module that employs an electrolytic capacitor including an electrode foil with a short pit length in combination, in the same volume of the electrolytic capacitor module. On the other hand, the use of an electrolytic capacitor including an electrode foil with a short pit length makes it possible to downsize an electrolytic capacitor module. In preparing an electrolytic capacitor module with the same volume, when an electrolytic capacitor including an electrode foil with a short pit length is used in combination, it is possible to achieve an electrolytic capacitor module that generates capacitance more in a high-frequency region than an electrolytic capacitor module provided only with electrolytic capacitors each including an electrode foil with a long pit length.
<Filter Circuit>

(7) It is possible to efficiently remove high-frequency components and fluctuation components in a wide region from a low-frequency region to a high-frequency region.

(8) It is possible to reduce a filter circuit in size and weight.
<Power Converter>

(9) It is possible to output a power conversion output from which high-frequency components and fluctuation components in a wide region from a low-frequency region to a high-frequency region are removed.

(10) It is possible to reduce a volume ratio of an electrolytic capacitor and a volume ratio of a filter including the electrolytic capacitor in a power converter and to reduce the power converter in size and weight.

Other objects, features, and advantages of the configuration of the present disclosure will become clearer with reference to the accompanying drawings and each embodiment.

BRIEF DESCRIPTION OF DRAWINGS

FIG. 10B is a view illustrating frequency characteristics of capacitance when a pit length is 55 [μm], and FIG. 10C is a view illustrating frequency characteristics of capacitance when a pit length is 27 [μm].

FIG. 12 is a list of pit lengths, frequencies, and capacitance in Examples 1 to 4 and Comparative Examples 1 to 4.

DESCRIPTION OF EMBODIMENTS

Embodiment

<Electrolytic Capacitor Module>

Figure 1A:
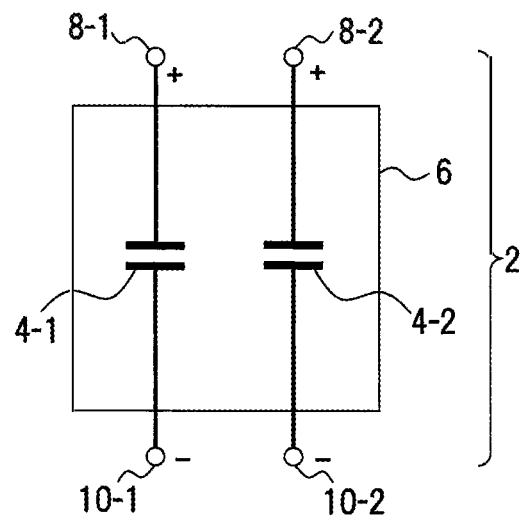
FIG. 1A is a view illustrating an electrolytic capacitor module according to an embodiment.

FIG. 1A illustrates an electrolytic capacitor module according to an embodiment. A configuration illustrated in FIG. 1 is an example, and the present invention is not limited thereto.

This electrolytic capacitor module (hereinafter simply referred to as "capacitor module") 2 includes at least two electrolytic capacitors having etching pits formed in an electrode foil. The electrolytic capacitors are a first electrolytic capacitor 4-1 and a second electrolytic capacitor 4-2 which are two types of electrolytic capacitors with different etching pit lengths. Herein, "two types of electrolytic capacitors with different etching pit lengths" are classified according to pit lengths, considering a length (depth) of tunnel-like etching pits, as a pit length, which are formed in an electrode foil of a capacitor element for an electrolytic capacitor.

In this embodiment, the electrolytic capacitor 4-1 has a short etching pit length, and the electrolytic capacitor 4-2 has a long etching pit length. The electrolytic capacitors 4-1 and 4-2 are, for example, aluminum electrolytic capacitors.

The electrode foil is, for example, an electrode foil on the anode side and is a foil of a valve metal such as aluminum. Etching pits to be described in detail in Examples are, for example, tunnel-like pits formed in the electrode foil by DC etching, and the tunnel-like pits extends from a foil surface in a thickness direction. A pit length is a length (depth) from a pit opening which is on a surface of a foil to the tip of a pit which is in a deep part of the foil.

The electrolytic capacitor 4-1 has a pit length of, for example, 27 [μm] or less. The electrolytic capacitor 4-2 has a pit length, for example, over 27 [μm], and herein has a pit length of 55 [μm].

The capacitor module 2 includes a casing 6. The casing 6 may be formed of an insulator or a conductor with an insulated surface. The casing 6 houses the electrolytic capacitors 4-1 and 4-2. Each of the electrolytic capacitors 4-1 and 4-2 may be singular or plural. Alternatively, the numbers of the mounted electrolytic capacitors 4-1 and 4-2 may be different from each other.

On the anode side and the cathode side, the electrolytic capacitor 4-1 includes external terminals 8-1 and 10-1, respectively. Similarly, the electrolytic capacitor 4-2 includes external terminals 8-2 and 10-2. Each of the external terminals 8-1, 8-2, 10-1, and 10-2 is insulated and drawn out of the casing 6.

Figure 1B:
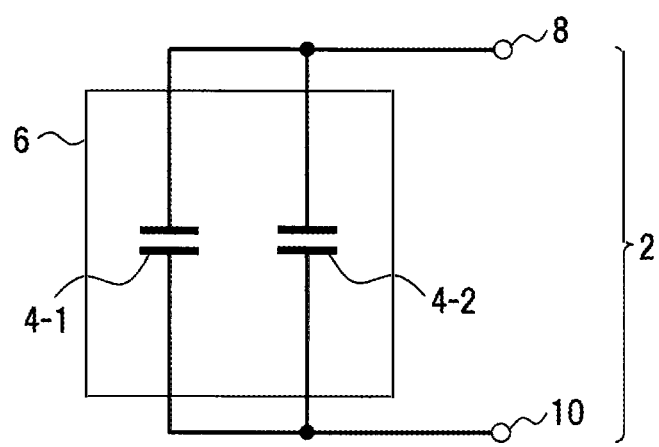
FIG. 1B is a view illustrating a modification of the electrolytic capacitor module.

For example, as illustrated in FIG. 1B, anodes connect to a common line and cathodes similarly connect to a common line for the electrolytic capacitors 4-1 and 4-2 to be connected in parallel, and the electrolytic capacitors 4-1 and 4-2 may have a common external terminal 8 on the anode side and a common external terminal 10 on the cathode side.

The anodes may connect to the common line within the casing 6 or outside the casing 6, or the cathodes may connect to the common line within the casing 6 or outside the casing 6.

In this capacitor module 2, impedance Z1 of the electrolytic capacitor 4-1 is represented by $$Z1 = ESR1 + j\{\omega ESL1 - 1/\omega C1\} \quad (1)$$
$$= ESR1 + jXs1,$$

where C1 represents capacitance of the electrolytic capacitor 4-1, ESR1 represents equivalent series resistance, and ESL1 represents an equivalent inductance, and $jXs1$ represents combined impedance of an inductance component and a capacitance component.

Impedance Z2 of the electrolytic capacitor 4-2 is represented by $$Z2 = ESR2 + j\{\omega ESL2 - 1/\omega C2\} \quad (2)$$
$$= ESR2 + jXs2,$$

where C2 represents capacitance of the electrolytic capacitor 4-2, ESR2 represents equivalent series resistance, ESL2 represents an equivalent inductance, and jXs2 represents combined impedance of an inductance component and a capacitance component.

<Filter Circuit>

Figure 2A:
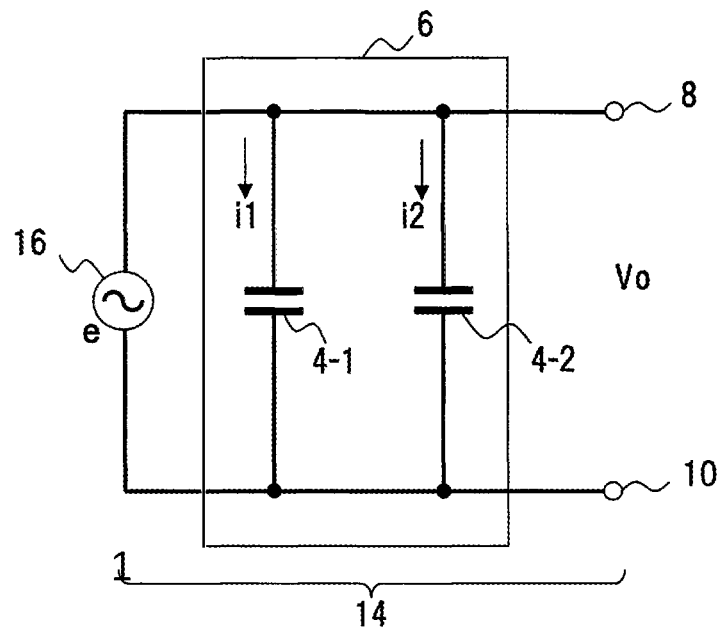
FIG. 2A is a view illustrating a filter circuit according to an embodiment.

FIG. 2A illustrates a filter circuit including the capacitor module 2. In FIG. 2A, the same parts as those in FIG. 1 are denoted by the same reference signs.

The capacitor module 2 may be used, for example, for a filter circuit 14, as illustrated in FIG. 2A. In the filter circuit 14, the anodes connect to a common line and the cathodes connect to a common line for the electrolytic capacitors 4-1 and 4-2 to form a parallel circuit. In other words, the capacitor module 2 has a basic configuration of a power semiconductor circuit, the electrolytic capacitors 4-1 and 4-2 are connected in parallel, and the electrolytic capacitors 4-1 and 4-2 differ from each other only in pit length.

A power source 16 is connected to the parallel circuit including the electrolytic capacitors 4-1 and 4-2. The power source 16 is, for example, a high-frequency power source, specifically, a switching part that generates a high-frequency output in a power converter such as an inverter or a converter that converts power by switching.

When this filter circuit 14 is used, the electrolytic capacitor 4-1 serves as a capacitor with high capacitance efficiency in a high-frequency region, and the electrolytic capacitor 4-2 serves as a capacitor with high capacitance efficiency in a low-frequency region.

When an AC or DC current i is applied from the power source 16 to the capacitor module 2, high-frequency components and fluctuation components included in the current i are removed by a filtering function due to an energy storing function of the electrolytic capacitors 4-1 and 4-2. Accordingly, a DC component output of the power source 16, that is, an output Vo from which the high-frequency components and the fluctuation components are removed is extracted from between the terminals of the electrolytic capacitors 4-1 and 4-2.

Herein, (3)

$$i = i1 + i2$$
$$= e/Z1 + e/Z2$$
$$= e(1/Z1 + 1/Z2)$$
$$= e/Zt,$$

where e represents a voltage applied from the power source 16 to the electrolytic capacitors 4-1 and 4-2, i represents a current flowing through the parallel circuit including the electrolytic capacitors 4-1 and 4-2, i1 represents a current flowing through the electrolytic capacitor 4-1, i2 represents a current flowing through the electrolytic capacitor 4-2, Z1 represents impedance of the electrolytic capacitor 4-1, Z2 represents impedance of the electrolytic capacitor 4-2, and Zt represents combined impedance. Accordingly, the combined impedance Zt is represented by $$Zt = Z1 \cdot Z2/(Z1+Z2) \quad (4).$$

Based on Formulae (1), (2), and (4), $$Ct = C1 + C2 \quad (5),$$

where Ct represents combined capacitance of the electrolytic capacitors 4-1 and 4-2 of the capacitor module 2.

Although the filter circuit 14 only includes the electrolytic capacitors 4-1 and 4-2, a resistor and an inductor may be used in combination, and the numbers of each of the electrolytic capacitors 4-1 and 4-2 may be two or more.

<Power Converter>

Figure 2B:
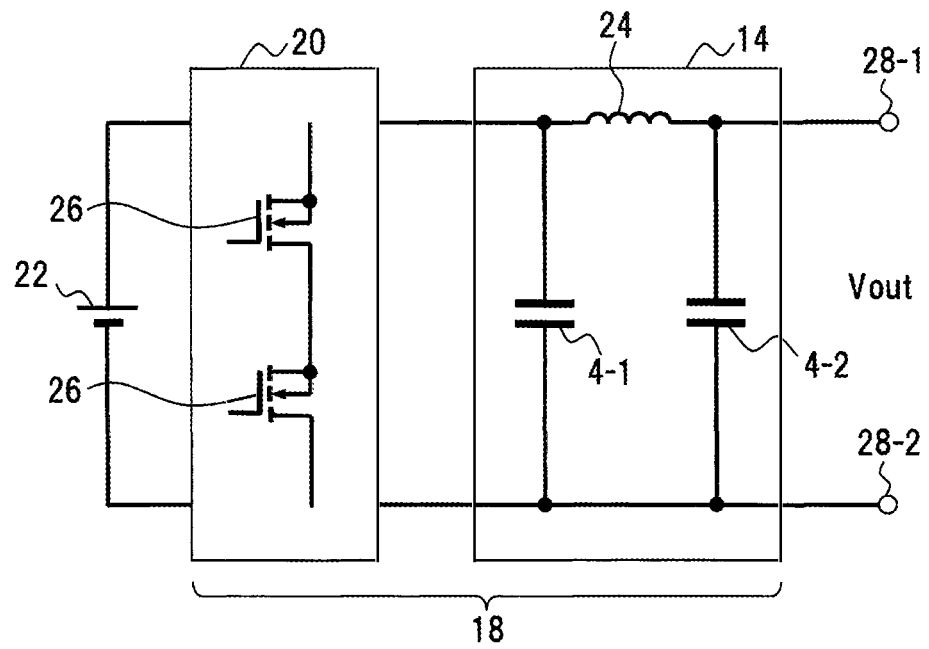
FIG. 2B is a view illustrating a power converter according to an embodiment.

FIG. 2B illustrates an example of a power converter. In FIG. 2B, the same parts as those in FIG. 2A are denoted by the same reference signs.

A power converter 18 includes a converter 20 and a filter circuit 14. The converter 20 includes, for example, switching elements 26 such as MOSFETs or IGBTs and intermits, for example, a DC voltage of a battery 22 by switching to convert to an AC voltage. The filter circuit 14 is the aforementioned filter circuit 14 provided with an inductor 24, being configured to remove high-frequency components and fluctuation components generated by switching of the converter 20. Accordingly, an AC output Vout with no high-frequency components and fluctuation components is extracted from output terminals 28-1 and 28-2.

Figure 3A:
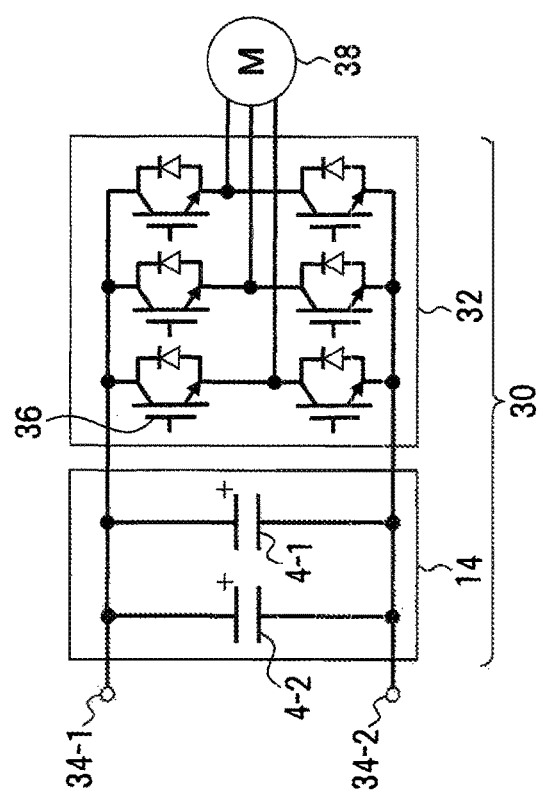
FIGS. 3A and 3B are views each illustrating a power converter according to an embodiment.

FIG. 3A illustrates another power converter. In FIG. 3A, the same parts as those in FIG. 2 are denoted by the same reference signs.

A power converter 30 includes a filter circuit 14 and an inverter 32. The filter circuit 14 includes the aforementioned electrolytic capacitors 4-1 and 4-2. The electrolytic capacitor 4-1 is disposed instead of a film capacitor in the related art.

A DC voltage E applied to input terminals 34-1 and 34-2 is smoothed by an energy storing function of the electrolytic capacitors 4-1 and 4-2. After fluctuation components and AC components are removed from the DC voltage E, the DC voltage E is applied to the inverter 32.

The inverter 32 includes switching elements 36 such as MOSFETs or IGBTs and converts a DC voltage into, for example, a three-phase AC output by switching. This three-phase AC output is applied to a motor 38, or a load, so as to rotate the motor 38.

Figure 3B:
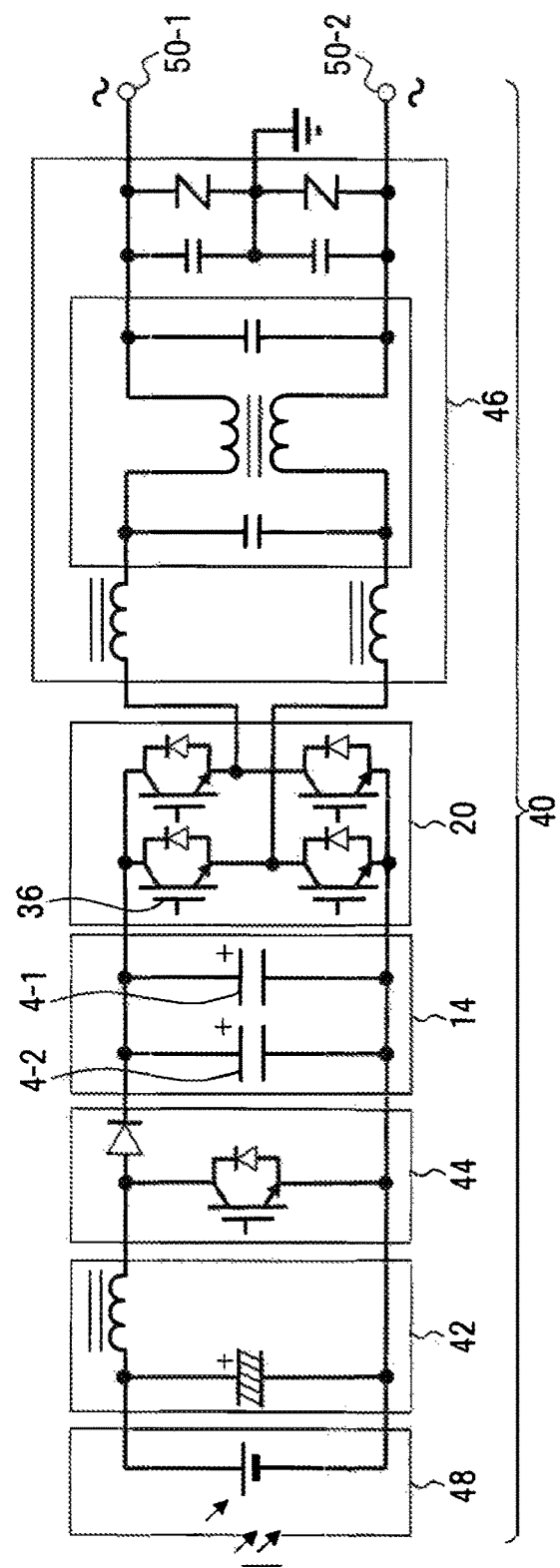

FIG. 3B illustrates another power converter. In FIG. 3B, the same parts as those in FIG. 3A are denoted by the same reference signs.

A power converter 40 includes a smoothing unit 42, a rectifying unit 44, a filter circuit 14, a converter 20, and a waveform adjusting unit 46.

The smoothing unit 42 smooths produced power outputs of a solar panel 48. An output of the smoothing unit 42 is rectified by the rectifying unit 44 and allowed to pass through the filter circuit 14. The filter circuit 14 includes the aforementioned electrolytic capacitors 4-1 and 4-2, being configured to smooth fluctuation components and remove high-frequency components by an energy storing function of the electrolytic capacitors 4-1 and 4-2 so as to produce a DC output.

As described above, the converter 20 includes switching elements 36 such as MOSFETs or IGBTs and converts a DC voltage into, for example, a single-phase AC output by switching. This single-phase AC output is adjusted to a sine wave output by the waveform adjusting unit 46 and extracted from the output terminals 50-1 and 50-2 and made into a commercial AC output.

Effects of Embodiment

According to this embodiment, the following effects are obtained.

(1) In a parallel circuit including the electrolytic capacitors 4-1 and 4-2, or two types of electrolytic capacitors with different pit lengths, the combined use of the electrolytic capacitor 4-1 having high capacitance efficiency in a high-frequency region makes it possible to prevent a device from increasing in size as compared with a parallel circuit including only the electrolytic capacitors 4-2.

(2) Since capacitance in a high-frequency region is ensured, it is possible to remove a film capacitor with a large volume, which eliminates a problem that a device becomes large due to the film capacitor as compared with a parallel circuit including an aluminum electrolytic capacitor and a film capacitor.

(3) It is possible to enhance performance of an electrolytic capacitor in a high-frequency region and to employ the electrolytic capacitor in various uses such as the filter circuit 14 and the power converters 18, 30, and 40.

EXAMPLES

<Electrode Foil Included in Electrolytic Capacitors 4-1 and 4-2>

An electrode foil is preferable for an electrolytic capacitor for use under high voltage which is used in a high-frequency region of 100 [kHz] or more. Furthermore, the electrode foil is used for an anode foil, a cathode foil, or both.

A valve metal is used to form the electrode foil. As the electrode foil, there only has to be selected a valve metal material selected from, for example, aluminum, tantalum, niobium, niobium oxide, titanium, hafnium, zirconium, zinc, tungsten, bismuth, and antimony. A valve metal included in the electrode foil desirably has purity of 99.9 [%] or more for an anode foil and 99 [%] or more for a cathode foil. However, the valve metal included in the electrode foil may contain impurities such as silicon, iron, copper, magnesium or zinc.

The electrode foil has both surfaces expanded by etching. In the etched electrode foil, the both surfaces are provided with numerous etching pits extending in a tunnel shape in a thickness direction. Each etching pit is a cylindrical pit extending from a foil surface to the inside of the foil. A metal (residual core) of the foil exists in a part without a pit.

The etching may be either chemical etching or electrochemical etching. In DC etching, for example, an electrode foil immersed in a halogen ion-containing acidic aqueous solution is used as an anode, and a DC current is applied to the anode so as to form tunnel-like etching pits of the electrode foil. An aqueous solution of any one of hydrochloric acid, sulfuric acid, nitric acid, phosphoric acid, common salt, or a mixed solution thereof is preferably employed for the acidic aqueous solution for etching, for example.

A pit length of etching pits is adjusted by changing the time of current application. The etching is performed, for example, in two steps. For example, in the first step, the electrode foil is immersed in an aqueous solution containing chlorine ions, and a DC is applied to perform electrochemical etching, whereby forming etching pits. In the second step, for example, the electrode foil after the first step is immersed in an aqueous solution containing nitric acid ions or chlorine ions, and the etching pits formed in the first step are expanded by electrochemical etching or chemical etching. The pit length of etching pits is affected by the time of current application in the first step.

The pit length of etching pits is, for example, 27 [μm] or less. In a high-frequency region of 100 [kHz] or more, the capacitance does not increase in deep regions of pits of which the pit length is over 27 [μm], leading to such a disadvantage that the residual core of the electrode foil should be made thin but the electrode foil should be made thick to increase strength of the electrode foil. Reasons for the disadvantage will be described later.

In a high-frequency region of 100 [kHz] or more, when the pit length is 12 [μm] or more and 20 [μm] or less, a rate of increase in capacitance tends to slow down, but the capacitance increases almost in proportion to the pit length. Accordingly, from a viewpoint of efficiency, the pit length of 12 [μm] or more and 20 [μm] or less is preferable because this pit length range most efficiently contributes to an increase in capacitance.

When the pit length is more than 20 [μm] and 27 [μm] or less, capacitance is expected to increase in a frequency region of 100 [kHz] or more. Accordingly, from a viewpoint of capacitance, the pit length of more than 20 [μm] and 27 [μm] or less is preferable.

The pit length of etching pits is measured and determined by replica technique of chemical conversion coating. In the replica technique of chemical conversion coating, a dielectric film is formed in an etched electrode foil, and an aluminum base is dissolved with an iodine-methanol solution or the like, and then, the shape of an etching pit is observed through a scanning electron microscope (SEM). From numerous etching pits, 100 pits were randomly selected. Pit lengths of the selected pits are measured, and the mean value of the pit lengths is used as the pit length.

A dielectric film of the electrode foil is formed by chemical conversion. This dielectric film is formed in a surface of the electrode foil by oxidation treatment and is also formed in an inner wall of the etching pits. In a typical method for forming a dielectric film, an electrode foil is immersed in a buffer solution without halogen ions to make an anode, and a voltage is applied to the anode. Examples of the buffer solution include ammonium borate, ammonium phosphate, ammonium adipate, and organic acid ammonia.

<Electrolytic Capacitors 4-1 and 4-2>

The electrolytic capacitors 4-1 and 4-2 are each an electrolytic capacitor with the aforementioned electrode foil, such as a hybrid electrolytic capacitor, a bipolar electrolytic capacitor or a multilayer capacitor as well as a non-solid electrolytic capacitor in which a capacitor element with wound electrode foil is impregnated with an electrolytic solution.

The electrolytic capacitors 4-1 and 4-2 may be impregnated with either a liquid or solid electrolyte. Alternatively, the electrolytic capacitors 4-1 and 4-2 may each be any of a non-solid electrolytic capacitor, in which a dielectric film is formed in an anode foil, a hybrid electrolytic capacitor including a liquid electrolyte and a solid electrolyte, or a bipolar electrolytic capacitor, in which a dielectric film is formed in both an anode foil and a cathode foil.

In the capacitor element used in the electrolytic capacitor 4-1, an anode foil and a cathode foil are formed with the aforementioned electrode foils and are wound in a cylindrical shape with a separator interposed between the anode foil and the cathode foil. The dielectric film is formed in the electrode foil and the pit length is 27 [μm] or less.

After the capacitor element is impregnated with an electrolytic solution, an anode terminal is drawn from the anode foil and a cathode terminal is drawn from the cathode foil. This capacitor element is housed in an outer casing. A sealing member is used to seal the outer casing. An example of the sealing member includes a laminate sheet in which an elastic insulator such as a rubber sheet is attached to a hard insulating sheet such as a synthetic resin sheet. Anode and cathode external terminals are fixed to the sealing member in an integrated manner. Before sealing the outer casing, the anode terminal of the capacitor element is connected to the anode external terminal, and the cathode terminal is connected to the cathode external terminal. The outer casing that houses the capacitor element is sealed with the sealing member, and the capacitor element is subjected to aging treatment before commercialization.

The separator that insulates between the anode foil and the cathode foil, or the separator superposed between the anode foil and the cathode foil, is formed, for example, in a sheet shape. Examples of a forming material of the separator include cellulose such as kraft, abaca, esparto, hemp or rayon, mixed paper of the cellulose, polyester resin such as polyethylene terephthalate, polybutylene terephthalate, polyethylene naphthalate or derivative thereof, polytetrafluoroethylene resin, polyvinylidene fluoride resin, vinylon resin, polyamide resin such as aliphatic polyamide, semi-aromatic polyamide or wholly aromatic polyamide, polyimide resin, polyethylene resin, polypropylene resin, trimethylpentene resin, polyphenylene sulfide resin, and acrylic resin. Any one of these resins may be selected, or two or more of these resins may be selected and mixed together.

A solvent of the electrolytic solution, which is infiltrated into the capacitor element, is preferably ethylene glycol in uses under high voltage, but other solvents may be used in combination.

An example of the solvent of the electrolytic solution includes protonic organic polar solvent such as monohydric alcohol, polyhydric alcohol or oxy alcohol compound. Examples of the monohydric alcohol include ethanol, propanol, butanol, pentanol, hexanol, cyclobutanol, cyclopentanol, cyclohexanol, and benzyl alcohol.

Examples of polyhydric alcohol include γ-butyrolactone, diethylene glycol, dipropylene glycol, 1,2-propanediol, glycerin, 1,3-propanediol, 1,3-butanediol, and 2-methyl-2,4-pentanediol as well as ethylene glycol. Examples of the oxy alcohol compound include propylene glycol, glycerin, methyl cellosolve, ethyl cellosolve, methoxy propylene glycol, and dimethoxypropanol.

An example of the solvent of the electrolytic solution includes aprotic organic polar solvent such as amide, lactone, sulfolane, cyclic amide, nitrile or oxide. Examples of the amide include N-methylformamide, N, N dimethylformamide, N ethylformamide, N, N diethylformamide, N methylacetamide, N, N dimethylacetamide, N ethylacetamide, N, N-diethylacetamide, and hexamethylphos folic amide. Examples of the cyclic amide include γ-butyrolactone, N-methyl-2-pyrrolidone, ethylene carbonate, propylene carbonate, isobutylene carbonate, and isobutylene carbonate. An example of the nitrile includes acetonitrile. An example of the oxide includes dimethyl sulfoxide.

As for a solute of the electrolytic solution, examples include ammonium salt, amine salt, quaternary ammonium salt, and quaternary salt of cyclic amidine compound each having a conjugate base of an acid as an anionic component. Examples of amine with which the amine salt is made include primary amine, such as methylamine, ethylamine, propylamine, butylamine or ethylenediamine, secondary amine, such as dimethylamine, diethylamine, dipropylamine, methylethylamine or diphenylamine, and tertiary amine, such as trimethylamine, triethylamine, tripropylamine, triphenylamine or 1,8 diazabicyclo (5,4,0) undecene 7. Examples of quaternary ammonium with which quaternary ammonium salt is made include tetraalkylammonium, such as tetramethylammonium, tetraethylammonium, tetrapropylammonium, tetrabutylammonium, methyltriethylammonium or dimethyldiethylammonium, and pyridium, such as 1 methylpyridium, 1 ethylpyridium or 1,3 diethylpyridium. Examples of cation with which the quaternary salt of cyclic amidine compound is made include cations obtained by quaternizing the following compounds: imidazole monocyclic compound (imidazole homologue such as 1 methyl imidazole, 1,2-dimethyl imidazole, 1,4 dimethyl 2 ethyl imidazole or 1 phenyl imidazole; oxyalkyl derivative such as 1-methyl-2-oxymethyl imidazole or 1-methyl-2-oxyethyl-imidazole; nitro and amino derivative such as 1-methyl-4(5)-nitroimidazole or 1,2-dimethyl-4(5)-nitroimidazole); benzimidazole, such as 1-methyl benzimidazole or 1-methyl-2-benzyl benzimidazole; compound having a 2-imidazoline ring, such as 1 methyl imidazoline, 1,2-dimethyl imidazoline, 1,2,4-trimethyl imidazoline, 1,4-dimethyl-2-ethyl imidazoline or 1-methyl-2-phenyl imidazoline; and compound having a tetrahydropyrimidine ring, such as 1-methyl-1,4,5,6-tetrahydropyrimidine, 1,2-dimethyl-1,4,5,6-tetrahydropyrimidine, 1,8-diazabicyclo[5.4.0]undecene-7 or 1,5-diazabicyclo[48.3.0]nonene. Examples of the anionic component include conjugate bases of acid such as carboxylic acid, phenol, boric acid, phosphoric acid, carbonic acid or silicic acid.

<Structure and Function of Etching Pits of Electrode Foil>

Each of tunnel-like etching pits formed in an electrode foil has, for example, a pit diameter of about 1 [μm] and a pit length of 27 [μm] and has a large aspect ratio. In the electrode foil with such etching pits, in order to maintain foil strength, an electrode foil is subjected to such etching as to avoid penetration of the etching pits and leave a residual core with an appropriate thickness.

An electrolytic solution is sufficiently infiltrated into each etching pit in the electrode foil in order to generate high capacitance. In other words, the regulation of the etching pits by electrochemical treatment and the infiltration of the electrolytic solution into the pits lead to achievement of a high capacitance density.

In inner walls of the etching pits of the electrode foil on the anode side, a dielectric film including aluminum oxide ($Al_2O_3$) is formed by anodic oxidation treatment. This dielectric film functions as a dielectric. Accordingly, the thicker the dielectric film, the smaller the leakage current of an electrolytic capacitor. For this reason, the dielectric film is formed to have a thickness appropriate for a rated voltage of the electrolytic capacitor and an allowable leakage current.

<Equivalent Circuit Model of Etching Pit>

Figure 4A:
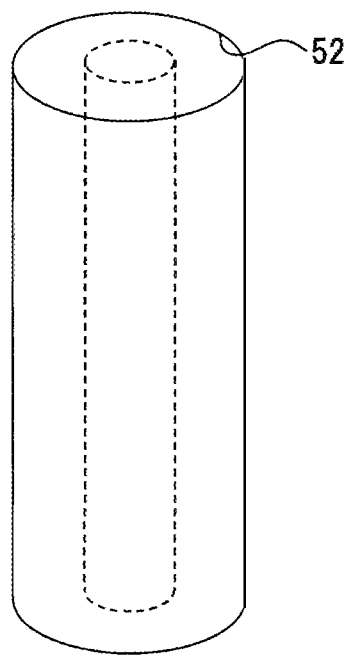
FIG. 4A is a view illustrating an etching pit model according to Example.

An etching pit selected from numerous etching pits formed in an anode foil is illustrated as a cylindrical pit as in FIG. 4A.

Figure 4B:
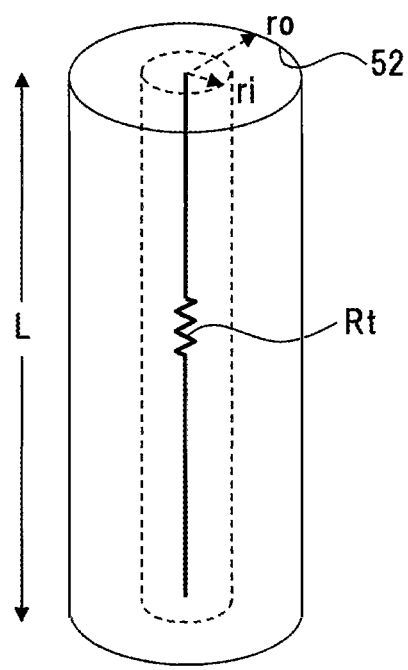
FIG. 4B is a view illustrating an equivalent circuit model of an etching pit.

An etching pit 52 has a large aspect ratio and has a dielectric film in an inner wall, as described above. Consequently, the etching pit 52 is illustrated as a simple structure model as in FIG. 4B. In FIG. 4B, ri represents an inner radius of the etching pit 52, and ro represents an outer radius of the etching pit 52.

In FIG. 4B, Rt represents resistance of a portion of one etching pit 52 infiltrated with an electrolytic solution. This resistance Rt is expressed by Formula (6):

$$Rt = \rho L / \pi r i^2 \qquad (6).$$

Similarly, capacitance Ct is represented by Formula (7):

$$Ct = 2\pi\varepsilon / \ln(ro/ri) \qquad (7),$$

where Ct represents capacitance obtained in the etching pit 52. Herein, ρ [Ωm] represents specific resistance of the electrolytic solution, ri [m] represents an inner radius of the etching pit, ro [m] represents an outer radius of the etching pit, L [m] represents an etching pit length, and c represents permittivity of the dielectric film. Note that ro minus ri corresponds to a thickness of the dielectric film.

Figure 5A:
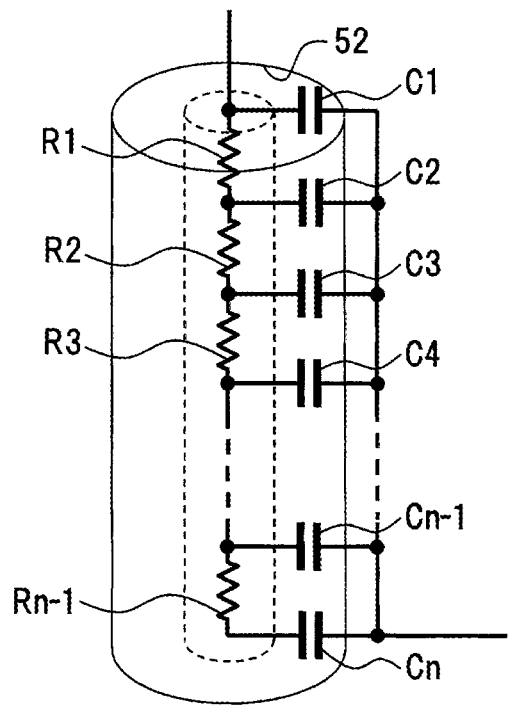
FIGS. 5A and 5B are views each illustrating an equivalent circuit model of an etching pit.

FIG. 5A illustrates an equivalent circuit model of an etching pit. One etching pit is represented by a CR ladder circuit that includes capacitors and resistors by a distributed constant circuit. This equivalent circuit model is oriented to a standard specification electrolytic capacitor for power converters and represents a circuit model for morphology information of an anode foil, such as a pit length, a hole diameter, and a pit density of an etching pit, and a thickness of a dielectric film in an anode foil.

Figure 5B:
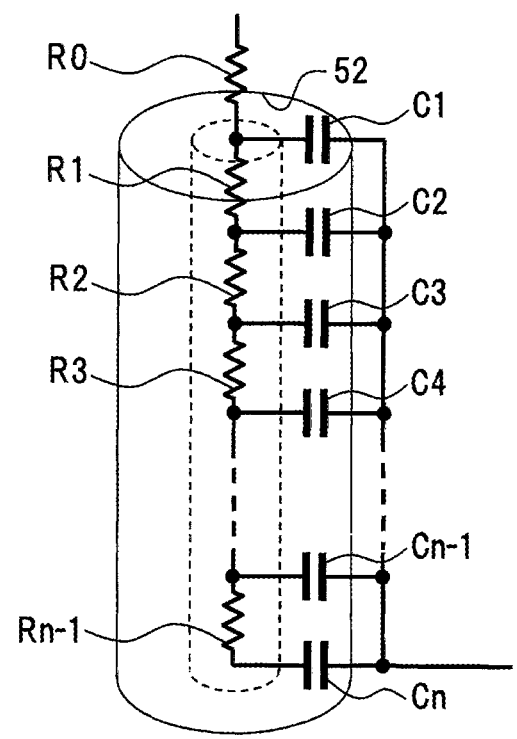

This equivalent circuit model is represented by one illustrated in FIG. 5B, considering the parameter R0 corresponding to the combined resistance of the components other than the electrode foil, such as the electrolytic solution and the separator disposed between the anode foil and the cathode foil.

<Transient Response to Current Pulse>

In order to determine that a rate of decrease in capacitance of an electrolytic capacitor increases in a high-frequency region, a transient response simulation to a current pulse was performed. In this simulation, a plurality of current pulses with different pulse durations was applied to the aforementioned equivalent circuit model. A simulation program with integrated circuit emphasis (SPICE) simulator was used to analyze that the transient responses to the current pulses differ from each other depending on pit lengths. The SPICE simulator is a software solver that simulates analog operations of electronic circuits.

Figure 6:
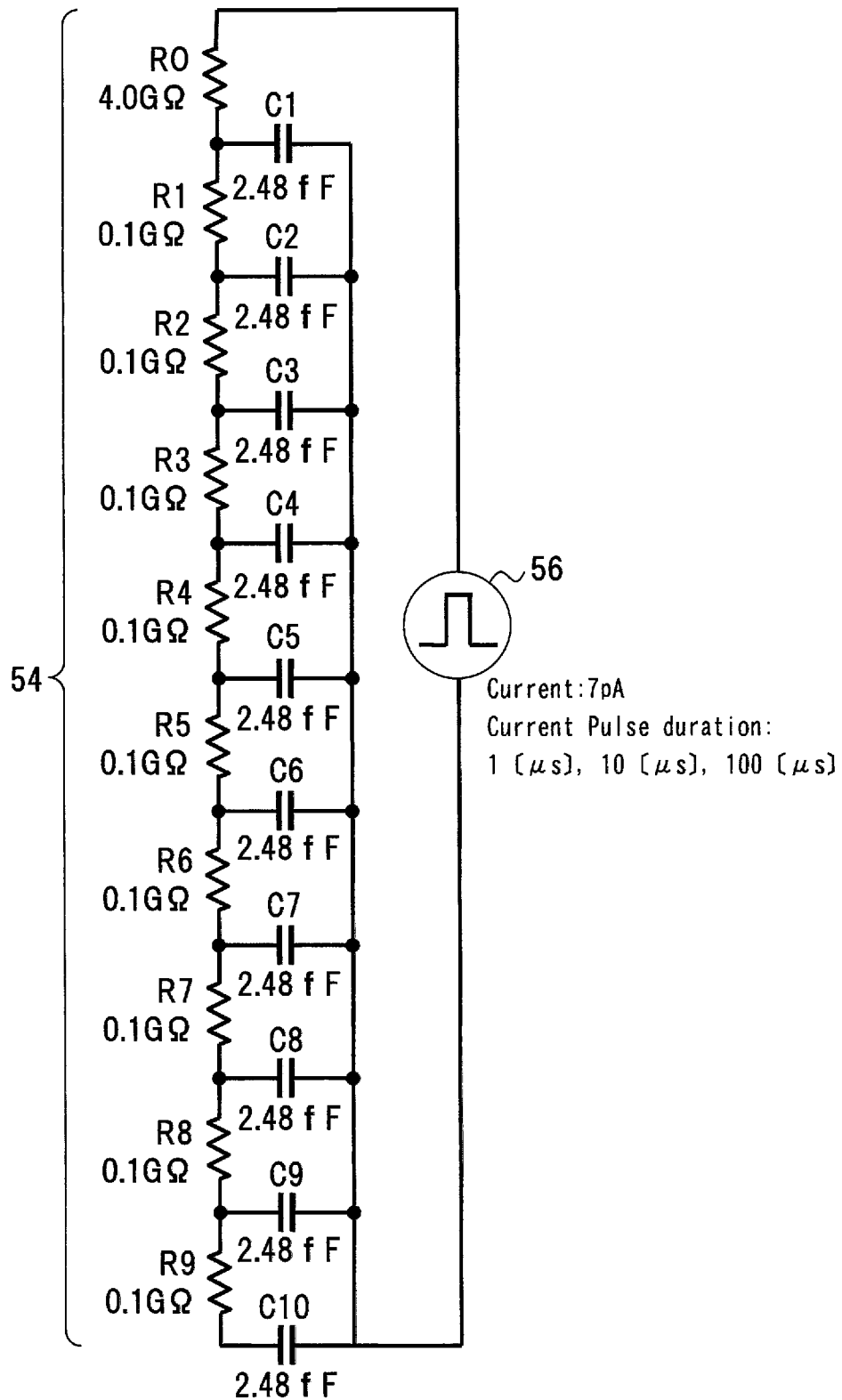
FIG. 6 is a view illustrating an equivalent circuit model used for a transient response simulation.

FIG. 6 illustrates an equivalent circuit model 54 used for simulation and illustrates load conditions of a current pulse source 56 for applying a current pulse to the equivalent circuit model 54. In the equivalent circuit model 54, C1 to C10 represent capacitor components in a pit length direction, and R0 to R9 represent resistance components. R0 is combined resistance of the separator and the electrolytic solution, and R1 to R9 are the resistance components attributed to electrolyte resistance inside a pit. In regard to the capacitor components C1 to C10, C1 represents a capacitor component on the side close to a pit opening, and C10 represents a capacitor component on the side close to the deepest part of the pit.

Here, resistance Rt was calculated by Formula (6) and capacitance Ct was calculated by Formula (7) using morphological information on etching pits and measured data on the resistance values of the electrolytic solution and the separator.

The resistance component R0 corresponding to a pit cross-sectional area was calculated, using equivalent series resistance (ESR) measured from an actual electrolytic capacitor (for example, a screw terminal aluminum electrolytic capacitor with a rated voltage of 400 [V]-2400 [µF]) in a wide frequency region.

According to the calculated values and the measurement results, the value of the resistance R0 was 4.0 [G], the values of the resistance R1 to R9 were 0.1 [G], and the capacitance of the capacitor components C1 to C10 were 2.48 [fF].

<Result of Transient Response Simulation>

The transient response simulation employed a plurality of current pulses that differ from each other only in pulse durations. For example, pulse durations of 1 [µs], 10 [µs], and 100 [µs] with pulse amplitude of 7 [pA] were used to analyze each terminal voltage (=charging voltage) generated in the capacitor components C1 to C10 as the transient response of the equivalent circuit model to which the current pulses was applied.

Figure 7A:
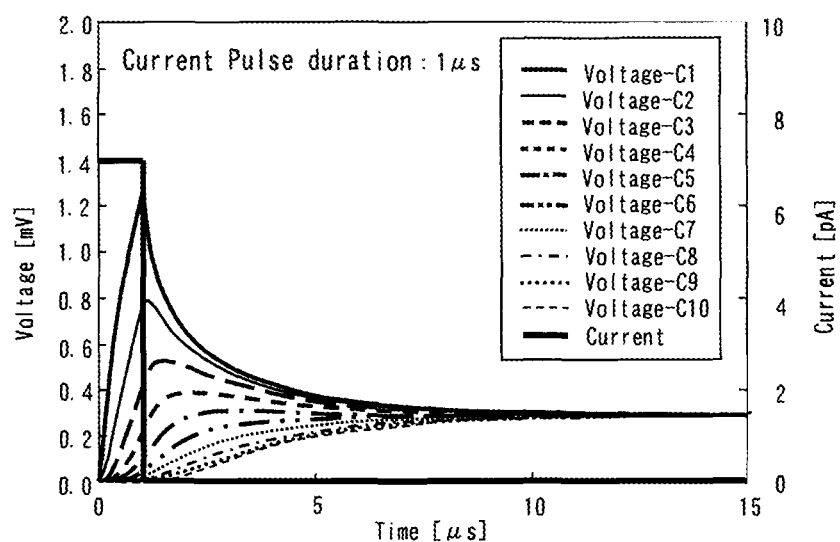
FIG. 7A is a view illustrating transient response when using a current pulse with a current pulse duration of 1 [μs]
Figure 7B:
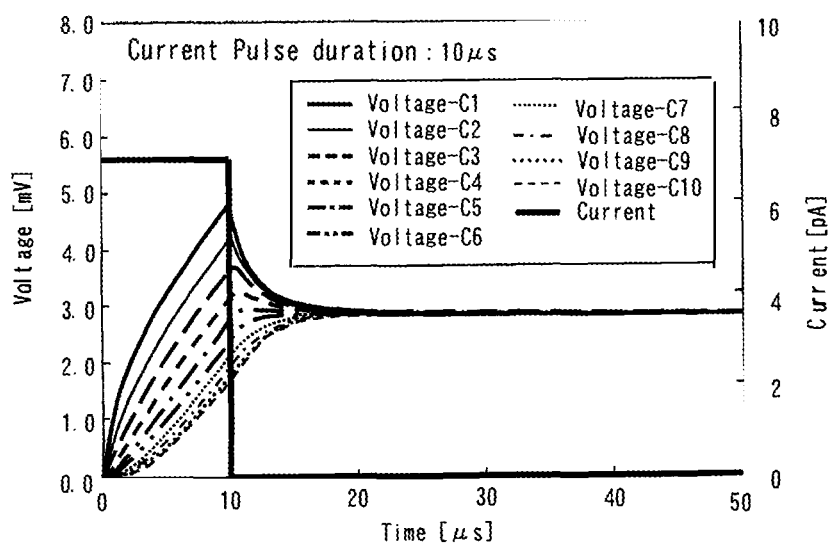
FIG. 7B is a view illustrating transient response when using a current pulse with a current pulse duration of 10 [μs]
Figure 7C:
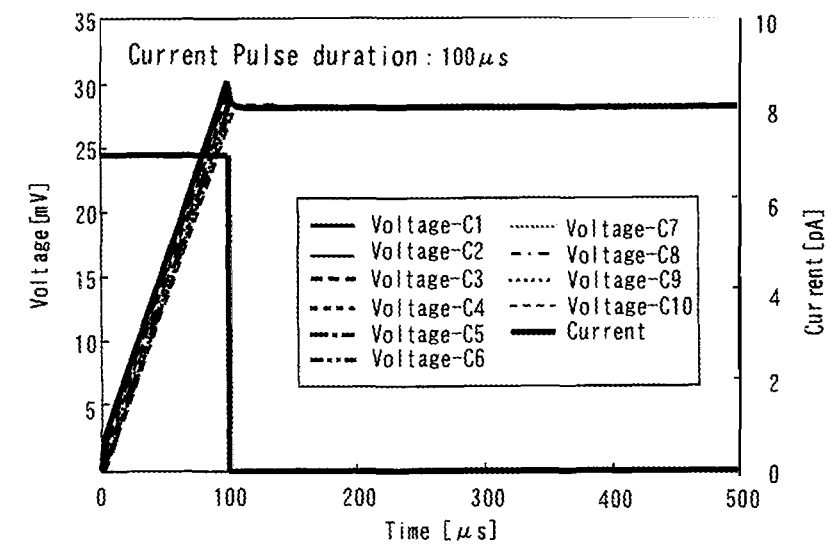
FIG. 7C is a view illustrating transient response when using a current pulse with a current pulse duration of 100 [μs].

FIGS. 7A to 7C illustrate results of analyzing a current pulse and a transient response. FIG. 7A illustrates transitions of terminal voltages appearing in C1 to C10 when a current pulse having a pulse duration of 1 [µs] is applied.

Comparing rates of increase in the terminal voltages (charging rates) of C1 to C10, when a current pulse with a pulse duration of 1 [µs] is applied, the charging rate of C1 which is close to the pit opening is fast, and the charging rate gradually slows down toward the deepest part of the pit, and the charging rate of C10 which is close to the deepest part of the pit is extremely slow. In addition, C5 to C10 which are from the middle to the deepest part of the pit show no increase of the charging voltage during the current pulse, showing no charging response according to the current pulse. In other words, C5 to C10 assumed to be correspond to deep parts of a pit do not contribute to capacitance of an electrolytic capacitor.

FIG. 7B illustrates transitions of terminal voltages appearing in C1 to C10 when a current pulse having a pulse duration of 10 [µs] is applied.

When a current pulse with a pulse duration of 10 [µs] is applied, the charging voltages of C5 to C10 which are from the middle to the deepest part of the pit increase during the current pulse. However, there is a large difference in charging rate between the pit opening and the deepest part of the pit. The charging response slows down toward the deepest part of the pit.

In regard to charging response to a current pulse having a pulse duration of 10 [µs], responsiveness from the middle of the pit to the deepest part of the pit improves as compared with a current pulse having a pulse duration of 1 [µs], but charging voltages are distributed from the middle to the deepest part of the pit.

FIG. 7C illustrates transitions of terminal voltages appearing in C1 to C10 when a current pulse having a pulse duration of 100 [µs] is applied.

When a current pulse with a pulse duration of 100 [µs] is applied, there is a slight voltage distribution in a pit depth direction. Although there is a slight difference in rise in charging rate, responsiveness at the deepest part of the pit is better than that of a current pulse with a pulse duration of 1 [µs] or 10 [µs].

Assuming high-speed switching from such response characteristics, even when a pit length is excessively long, it becomes clear that responsiveness of deep parts of a pit is reduced and that the efficacy of the effective area of the deep parts of the pit is low, which does not contribute to generation of capacitance.

<Performance Evaluation of Anode Foils with Different Pit Lengths>

To demonstrate the validity of the simulation results and to understand an appropriate pit length as an anode foil structure for high-speed switching, electrode foils with different pit lengths were prepared, that is, anode foils having etching pit lengths of 55 [μm], 48 [μm], 42 [μm], 33 [μm], and 27 [μm] were prepared.

In a formation of these anode foils, a 4N (four nines) high-purity aluminum foil having a thickness of 125 [μm] was used as an original foil. The aluminum foil was immersed in an acidic aqueous solution, and the aluminum foil was electrochemically etched by applying a DC voltage so as to form tunnel-like etching pits.

The etched aluminum foil was immersed in a boric acid solution and subjected to a chemical conversion at 650 [V]. A dielectric film was formed in the whole surface of the foil to obtain a sample.

A cross section of the sample was observed with SEM, and an average tunnel length and foil thickness were measured. In the measurement of capacitance of the singular foil, a sample piece having an area of 4 [cm$^2$] was punched out from the sample. While this sample piece was immersed in an ammonium borate solution, a sine wave voltage 1 [V] at a frequency of 120 [Hz] was applied to the sample piece, and capacitance was measured with an LCR meter.

Figure 8A:
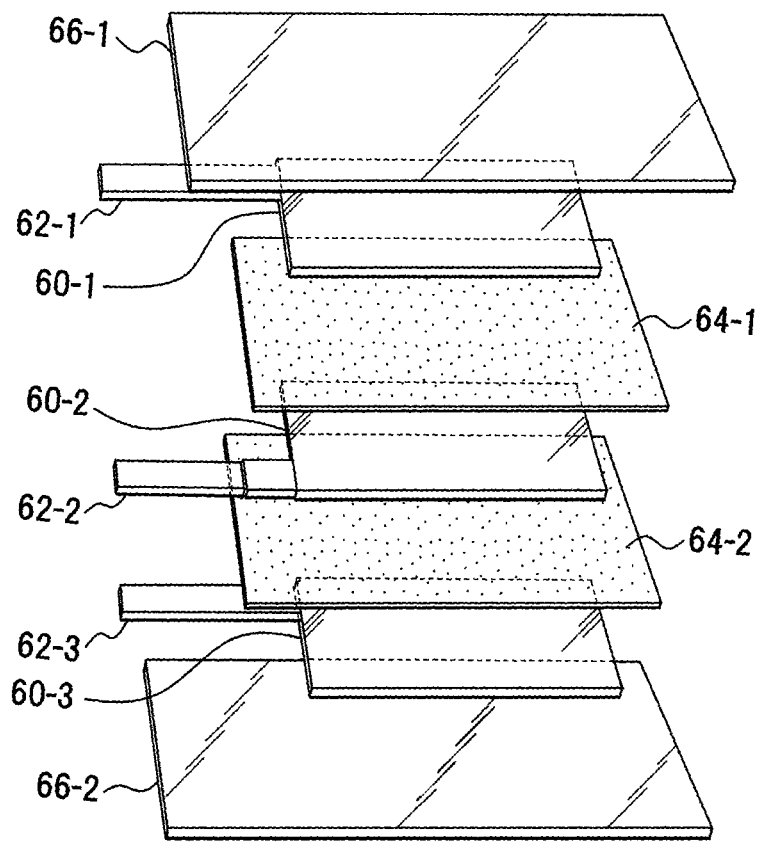
FIG. 8A is a view illustrating each member of an electrolytic capacitor cell.
Figure 8B:
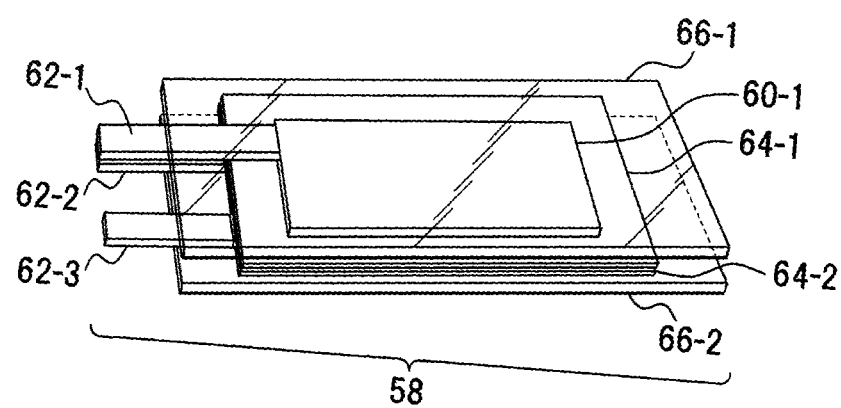
FIG. 8B is a view illustrating the electrolytic capacitor cell.

Anode foils with pit lengths of 55 [μm], 48 [μm], 42 [μm], 33 [μm], and 27 [μm] were formed. As illustrated in FIG. 8A, using each anode foil, a capacitor element was assembled and was impregnated with an electrolytic solution to form an electrolytic capacitor cell 58 having a simple structure as illustrated in FIG. 8B. In the electrolytic capacitor cell 58, electrode foils are denoted by 60-1, 60-2, and 60-3, leads are denoted by 62-1, 62-2, and 62-3, separators are denoted by 64-1 and 64-2, and glass plates are denoted by 66-1 and 66-2.

Figure 10A:
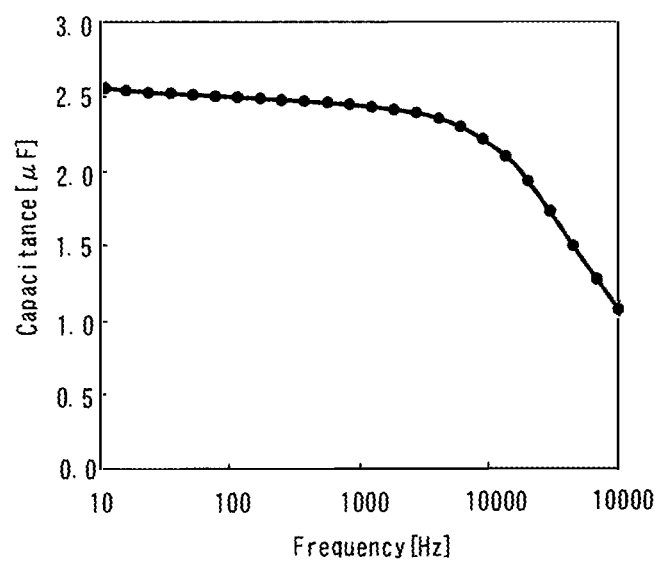
FIG. 10A is a view illustrating a relation between different pit lengths and capacitance.
Figure 10A:
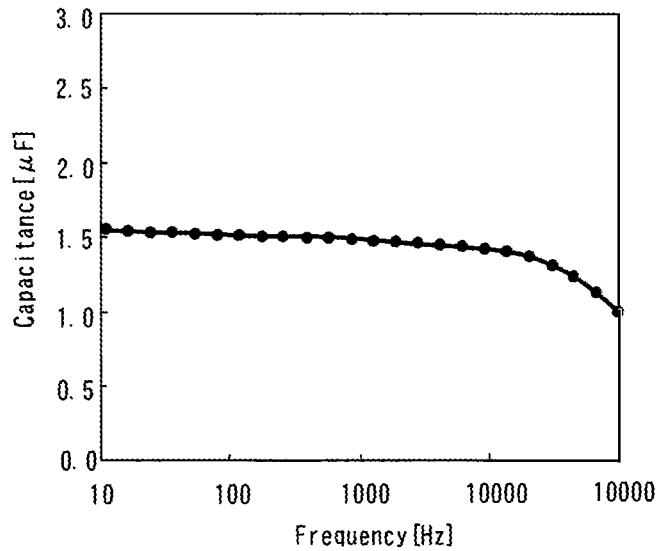

A sine wave voltage of 1 [V] in a frequency range of 10 [Hz] to 100 [kHz] was applied to each electrolytic capacitor cell, and capacitance of each electrolytic capacitor cell 58 was measured with an LCR meter so as to determined frequency dependence of the capacitance (FIG. 10 illustrates results of the measurement).

Furthermore, the present inventor determined how a difference in pit length affected charging response during high-speed switching.

In regard to the charging response of each electrolytic capacitor cell 58, when a plurality of current pulses with different pulse durations was each applied to each electrolytic capacitor cell 58, a current value and a terminal voltage generated by each current pulse were measured.

In this measurement, current pulses with pulse durations of 2000 [μs], 200 [μs], and 20 [μs] were used, and a value of charging resistance for supplying a charging current to the electrolytic capacitor cell 58 was changed so that an integrated electric quantity (total charge) Qp of the electrolytic capacitor cell 58 was always Qp=4 μC (constant). If a duty ratio of a pulse current applied to the electrolytic capacitor cell 58 is 50 [%], a pulse duration of 2000 [μs] corresponds to a frequency of 250 [Hz], a pulse duration of 200 [μs] corresponds to a frequency of 2.5 [kHz], and a pulse duration of 20 [μs] corresponds to a frequency of 25 [kHz].

Figure 9:
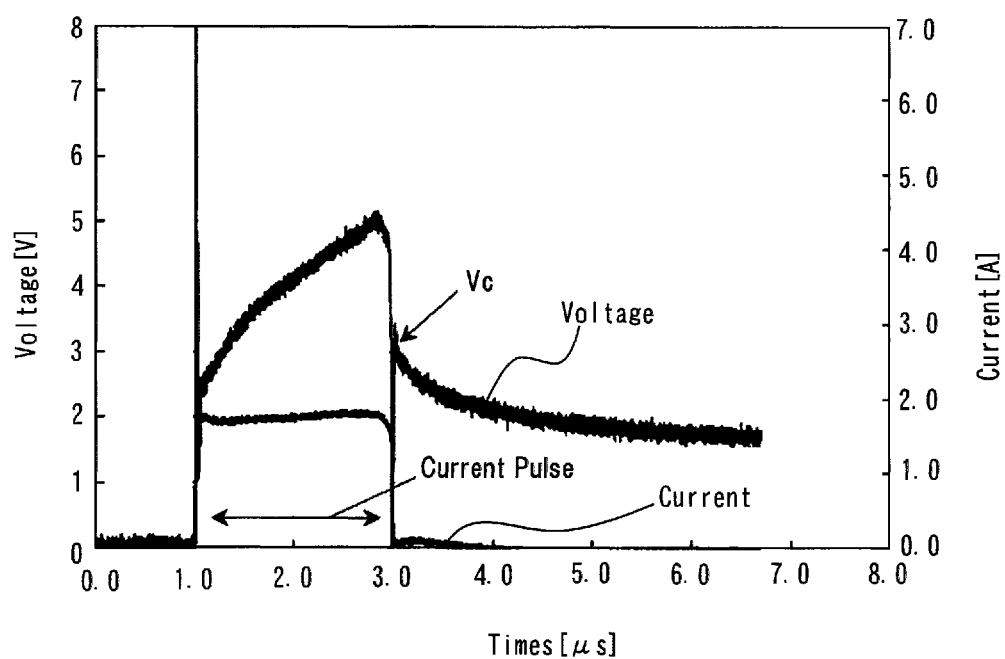
FIG. 9 is a view illustrating current pulse response of a typical electrolytic capacitor.

FIG. 9 illustrates a behavior of a terminal voltage of an electrolytic capacitor cell when a current pulse is applied to the electrolytic capacitor cell. A pulse duration of the current pulse is 2 [μs], and a current of the current pulse is 2 [A] in such a case.

The terminal voltage of the electrolytic capacitor cell increases almost linearly during the application of the current pulse. This indicates that the electrolytic capacitor cell is charged with a current pulse. Immediately after the application of the current pulse is stopped, the terminal voltage drops sharply. This phenomenon is caused by IR drop due to ESR of the electrolytic capacitor cell. Accordingly, a terminal voltage Vc that appears immediately after stoppage of the application of the current pulse is considered to be a voltage corresponding to an amount of charges accumulated in the electrolytic capacitor cell.

Using the integrated electric quantity Qp during the application of the current pulse and the terminal voltage Vc immediately after stoppage of the application of the current pulse, capacitance Cp that responds to the current pulse is obtained from Formula (8).

$$Cp=Qp/Vc \qquad (8)$$

<Relation Between Etching Pit and Capacitor Performance>

FIG. 10A illustrates a relation between pit lengths and capacitance of a singular foil measured in an aqueous solution. FIG. 10B illustrates capacitance when using an electrolytic capacitor cell 58 having a typical structure that includes an anode foil having an average pit length of 55 [μm] and a foil thickness. FIG. 10C illustrates capacitance when using an electrolytic capacitor cell 58 having a typical structure that includes an anode foil having an average pit length of 27 [μm] and a foil thickness. As is clear from these values of capacitance, the longer the pit length, the larger the capacitance. This indicates that the capacitance has frequency dependence.

Comparing the anode foils with a pit length of 55 [μm] and a pit length of 27 [μm], capacitance derived from the pit length of 55 [μm] is large in a low-frequency region of about 10 [Hz] to 10 [kHz]. In other words, since an effective surface area of the anode foil increases in proportion to the pit length, the capacitance increases due to the effective surface area.

In a high-frequency region around 100 [kHz], capacitance is substantially equal regardless of whether a pit length is 55 [μm] or 27 [μm]. In other words, the longer the pit length, the greater the frequency dependence of the capacitance, and the longer the pit length, the larger the rate of decrease in capacitance in a high-frequency region of about several tens [kHz] to 100 [kHz].

This result shows a similar tendency to the result of the transient response simulation and indicates that when a pit length of an etching pit becomes longer than necessary, normal charging does not occur in a deep part of a pit in a high-frequency region.

Therefore, an electrode foil with an optimum pit length is effective for an electrolytic capacitor oriented to uses at high frequencies.

Figure 11:
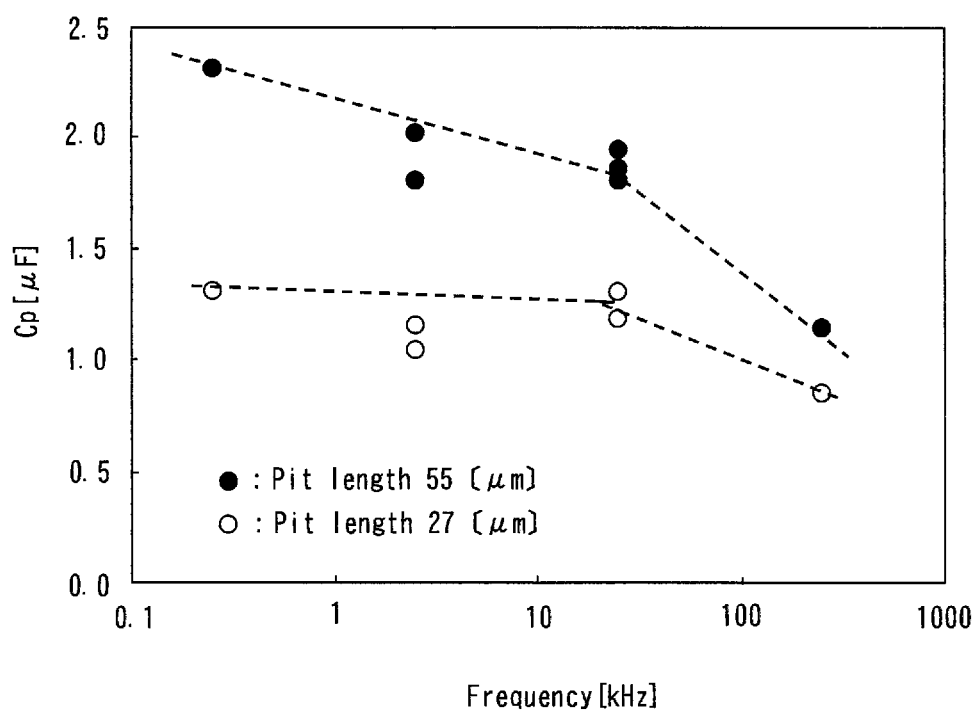
FIG. 11 is a view illustrating frequency dependence of capacitance when pit lengths are 55 [μm] and 27 [μm].
Figure 13A:
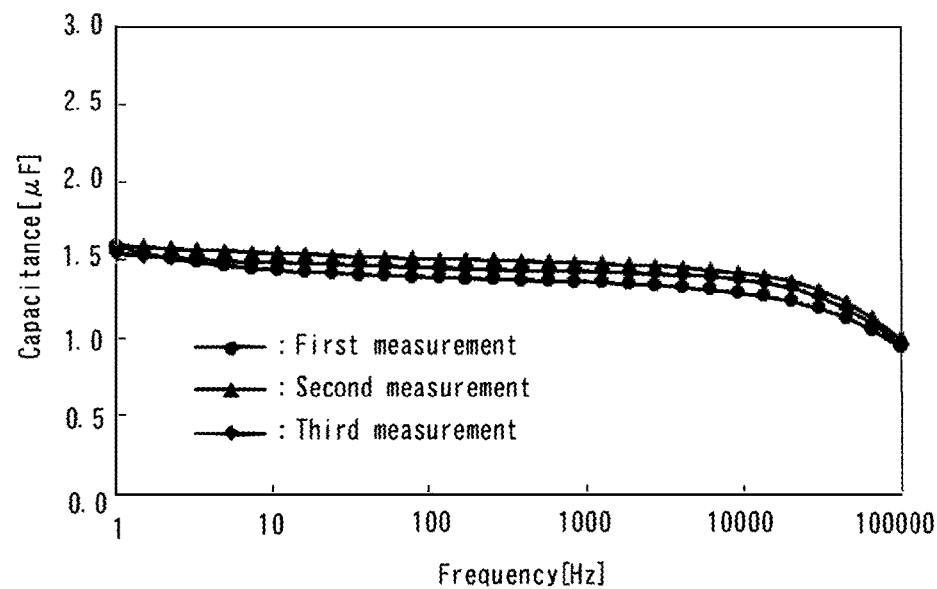
FIG. 13A is a view illustrating frequency characteristics of capacitance according to Comparative Example 1.
Figure 13B:
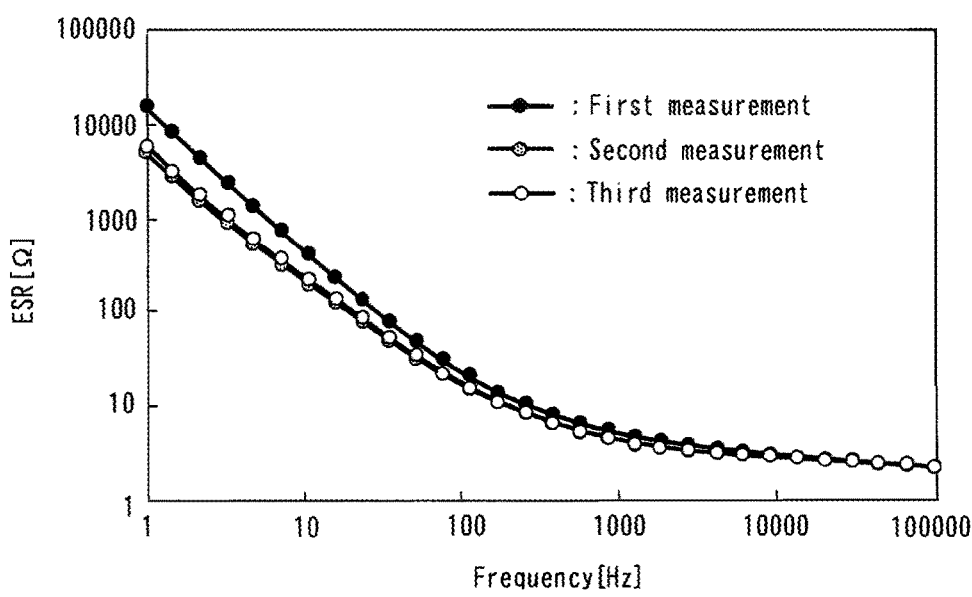
FIG. 13B is a view illustrating frequency dependence of ESR according to Comparative Example 1.
Figure 14A:
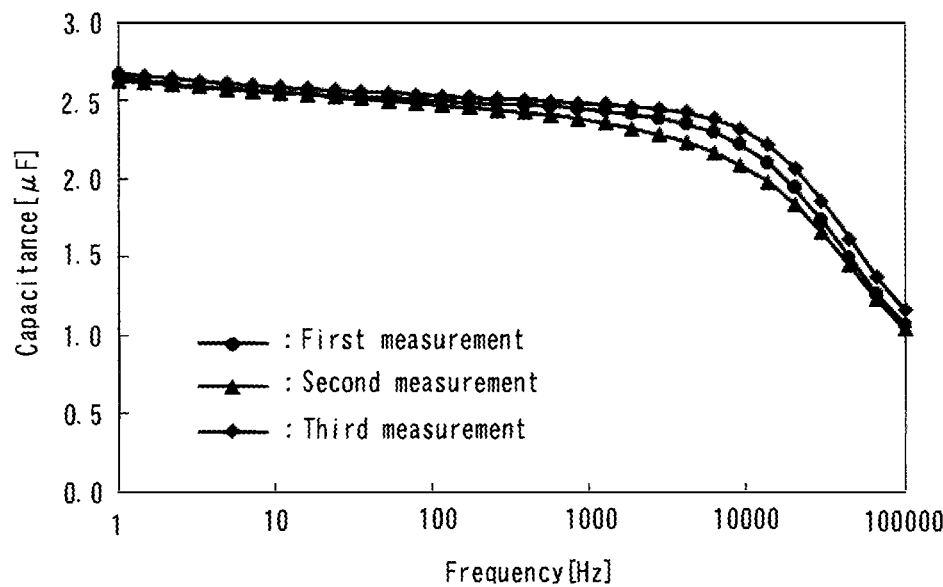
FIG. 14A is a view illustrating frequency characteristics of capacitance according to Comparative Example 2.
Figure 14B:
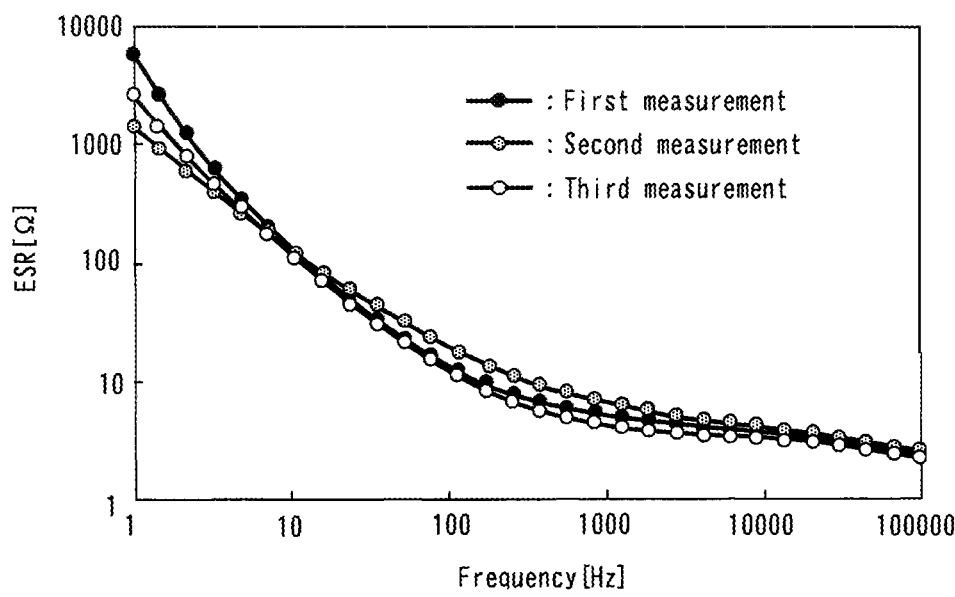
FIG. 14B is a view illustrating frequency dependence of ESR according to Comparative Example 2.
Figure 15A:
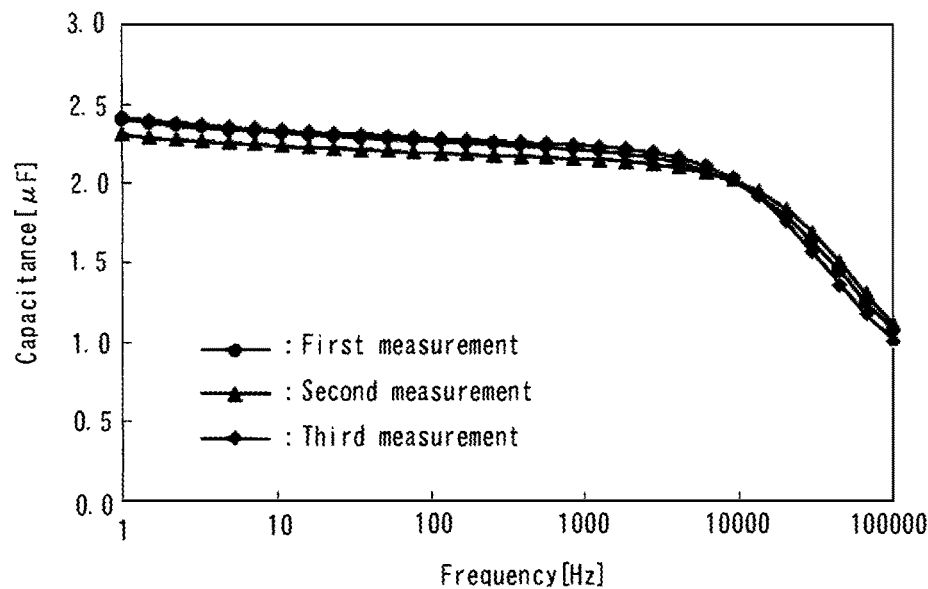
FIG. 15A is a view illustrating frequency characteristics of capacitance according to Comparative Example 3.
Figure 15B:
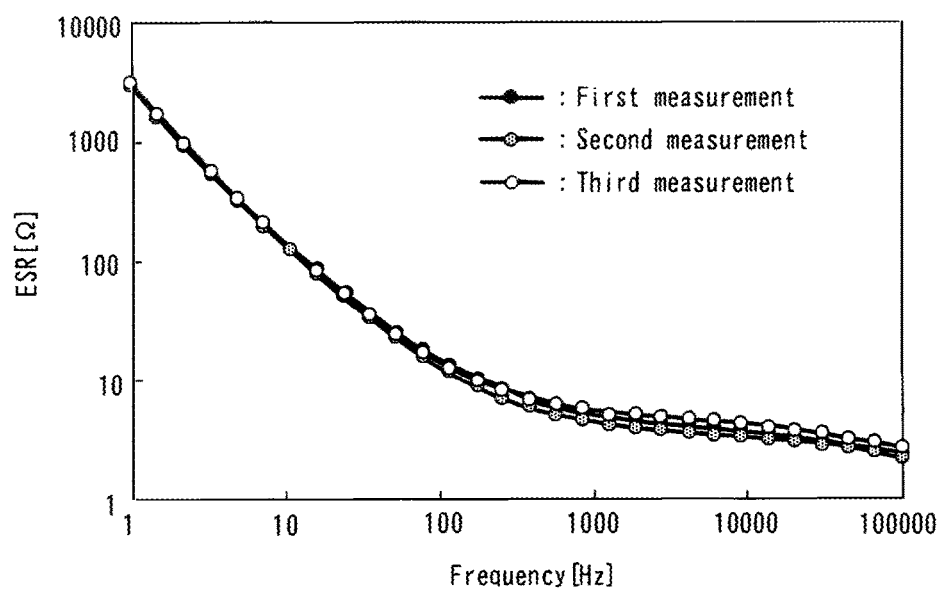
FIG. 15B is a view illustrating frequency dependence of ESR according to Comparative Example 3.
Figure 16A:
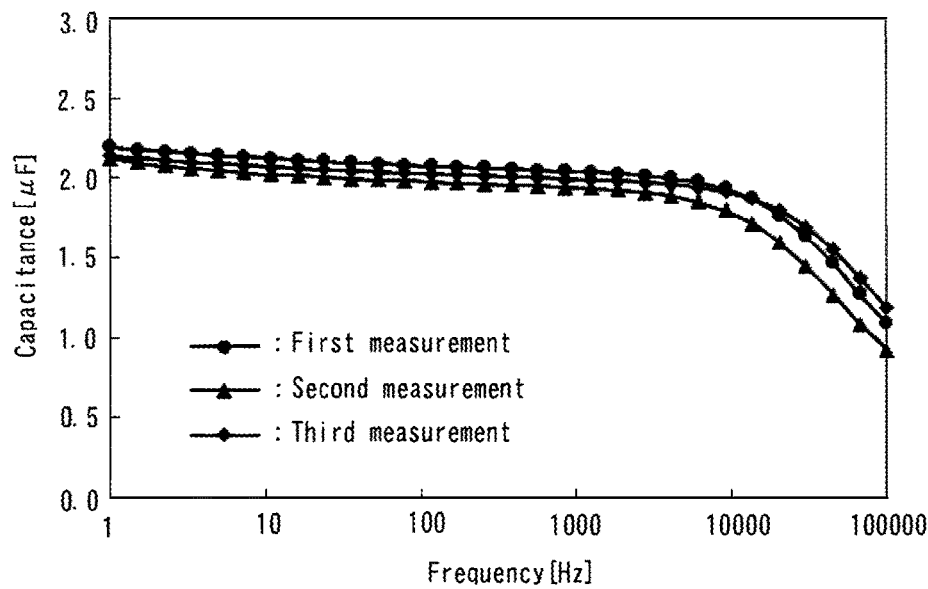
FIG. 16A is a view illustrating frequency characteristics of capacitance according to Comparative Example 4.
Figure 16B:
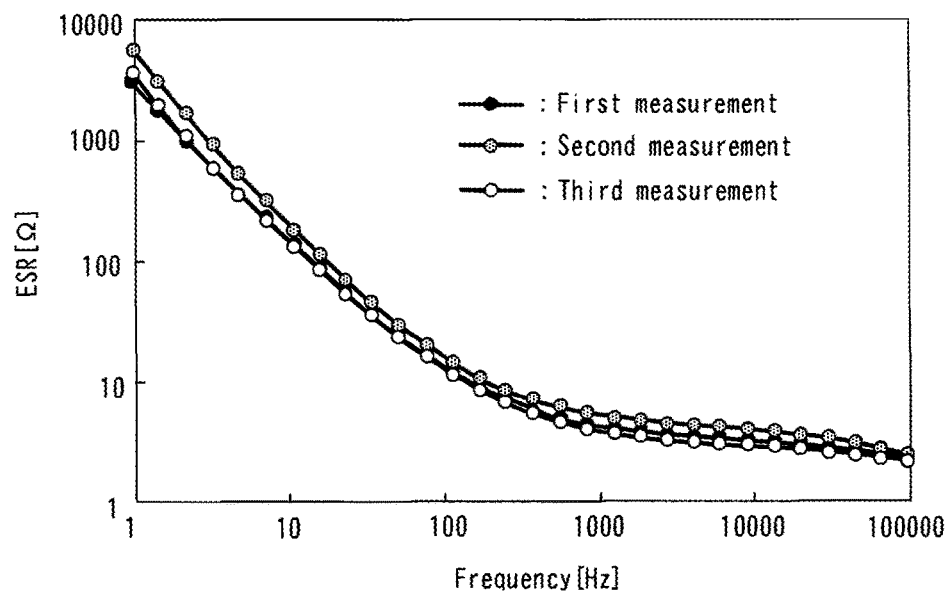
FIG. 16B is a view illustrating frequency dependence of ESR according to Comparative Example 4.
Figure 17A:
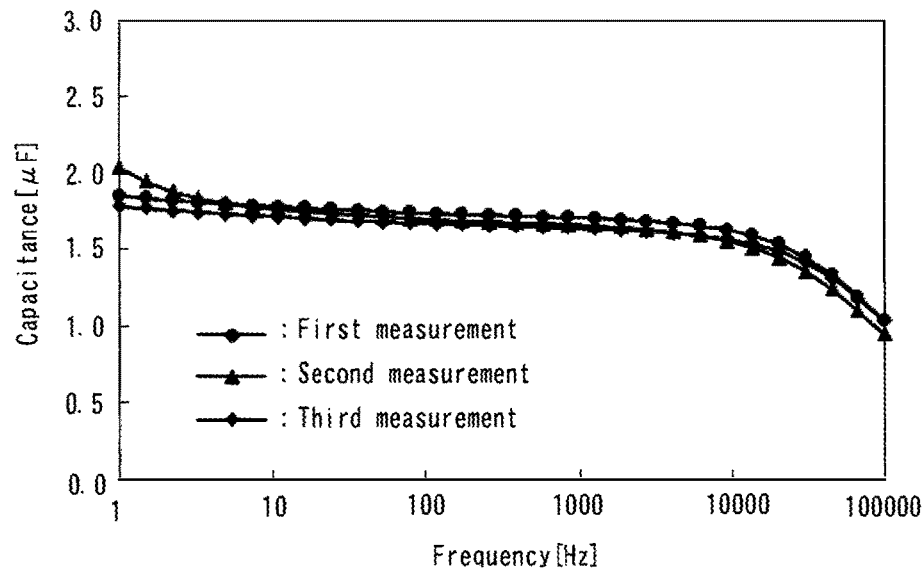
FIG. 17A is a view illustrating frequency characteristics of capacitance according to Example 1.
Figure 17B:
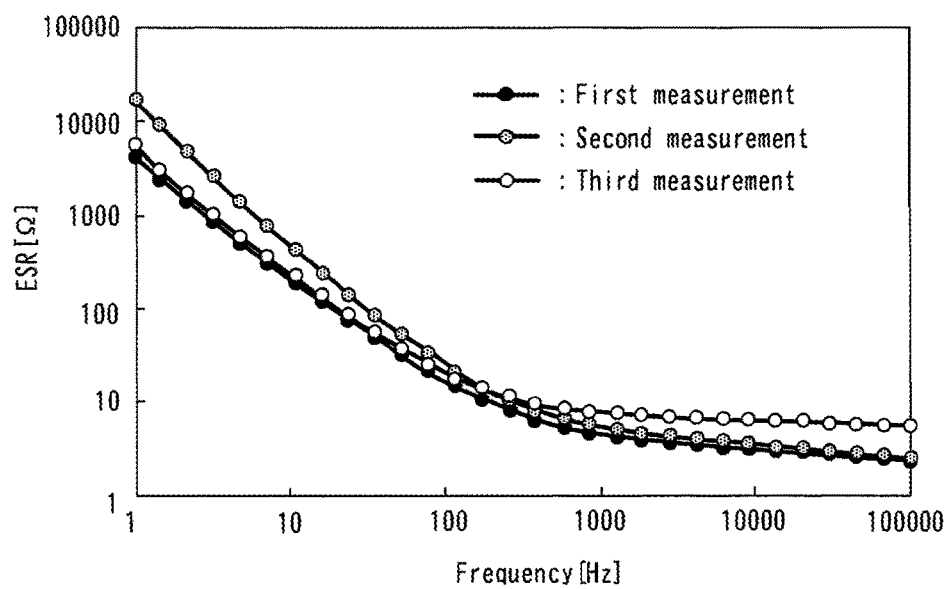
FIG. 17B is a view illustrating frequency dependence of ESR according to Example 1.

FIG. 11 illustrates a relation between switching frequencies and capacitance Cp when a plurality of current pulses with different pulse durations was each applied to electrolytic capacitor cells including anode foils with a pit length of 55 [μm] and a pit length of 27 [μm]. Note that the capacitance Cp is similarly obtained from the aforementioned Formula (7).

Since a difference in capacitance between a short pit length and a long pit length decreases as the frequency increases, it is effective and necessary to use an electrode foil with an optimum pit length according to frequency regions to be used, as described above.

Examples 1 to 4 and Comparative Examples 1 to 4

Hereinafter, Examples 1 to 4 and Comparative Examples 1 to 4 will be described. FIG. 12 illustrates pit lengths, frequencies, capacitance obtained from first to third measurement, and averages of the capacitance.

Example 1

An electrode foil with etching pits having a pit length of 27 [μm] was used as an anode foil to prepare a capacitor element of Example 1.

An aluminum foil having an area of 20 [mm]×20 [mm] and a foil thickness of 125 [μm] was used as the anode foil or an electrode foil on the anode side. The electrode foil was subjected to two-step etching. In the first step, the electrode foil was immersed in an aqueous solution containing hydrochloric acid, and the aluminum foil was electrochemically etched with a DC voltage to form etching pits.

In the second step, the electrode foil after the first step was immersed in an aqueous solution containing nitric acid and was etched electrochemically or chemically to expand the etching pits formed in the first step. The electrode foil etched in this manner was subjected to chemical conversion in an ammonium borate solution to form a layer of chemical conversion film in a surface of the foil. An etching pit length was measured by the replica technique of chemical conversion coating to determine that the pit length was 27 [μm].

An aluminum foil having an area of 30 [mm]×25 [mm] and a foil thickness of about 20 [μm] was used as a cathode foil or an electrode foil on the cathode side.

An aluminum lead wire having a head covered with silicon was attached to each of the anode and cathode foils. A separator, each including a 30 [mm]×25 [mm] kraft, and then, one anode foil was superposed thereon. The separators were impregnated in advance with an electrolytic solution including ethylene glycol as the main solvent and boric acid as the main solute. One set of the laminated anode foil, cathode foil, and separators was sandwiched between glass plates so as to yield the capacitor element of Example 1.

Comparative Examples 1 to 4

Electrode foils were etched to have different etching pit lengths by adjusting the time of voltage application, whereby preparing capacitor elements of Comparative Examples 1 to 4. The capacitor element of Comparative Example 1 employed an anode foil with an etching pit length of 55 [μm]. The capacitor element of Comparative Example 2 employed an anode foil with an etching pit length of 48 [μm]. The capacitor element of Comparative Example 3 employed an anode foil with an etching pit length of 42 [μm]. The capacitor element of Comparative Example 4 employed an anode foil with an etching pit length of 33 [μm].

The capacitor elements of Comparative Examples 1 to 4 were prepared in a similar manner and under similar conditions to the capacitor element of Example 1 except that etching pit lengths were changed.

<First Measurement of Capacitance>

In first measurement, capacitance of the capacitor elements of Example 1 and Comparative Examples 1 to 4 were measured. In this measurement, an LCR meter (4284A manufactured by Agilent Technologies) was employed. In regard to measurement conditions, an ambient temperature was set to 21 [° C.], an AC voltage was set to 1.0 [Vrms], and measurement frequencies were set in a range from 1 [Hz] to 100 [kHz]. The capacitance of each capacitor element was measured three times at each frequency. Results of the measurement were plotted on a graph where frequency is taken along the abscissa and capacitance is taken along the ordinate. FIGS. 13 to 18 show the results of the measurement.

Figure 18A:
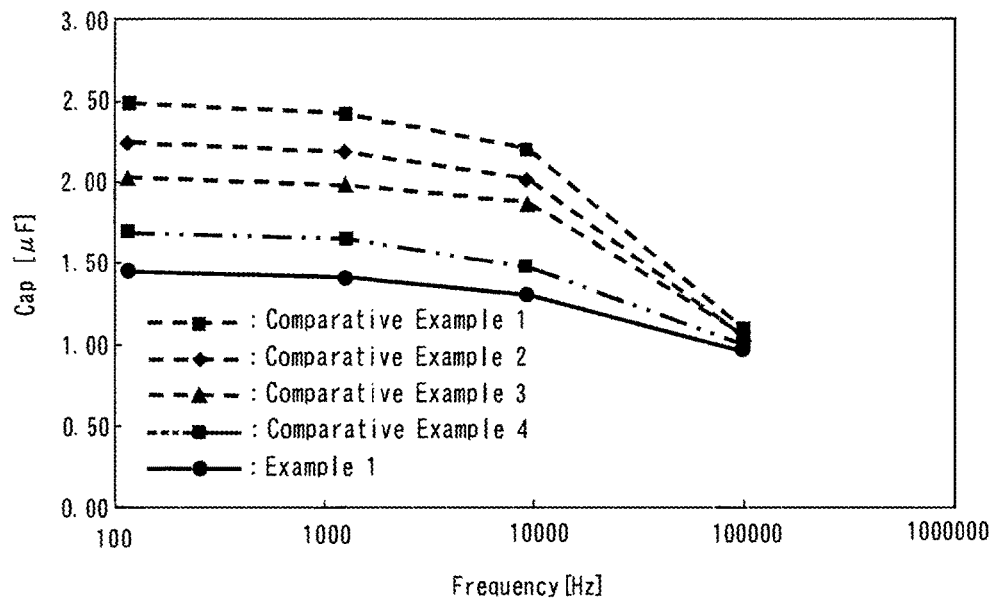
FIG. 18A is a view illustrating frequency dependence of capacitance in Example 1 and Comparative Examples 1 to 4.

FIGS. 13, 14, 15, 16, and 17 illustrate the results in Comparative Example 1, Comparative Example 2, Comparative Example 3, Comparative Example 4, and Example 1, respectively. In FIG. 18, averages in Example 1 and Comparative Examples 1 to 4 are plotted. Note that FIGS. 13A, 14A, 15A, 16A, and 17A show the measurement results of the capacitance, while FIGS. 13B, 14B, 15B, 16B, and 17B show the measurement results of ESR.

As illustrated in FIGS. 13 to 18, in a low-frequency region less than 10 [kHz], the capacitance increases depending on etching pit lengths. The capacitance in Example 1 is smaller than the capacitance in Comparative Examples 1 to 4 by 1.0 to 0.5 [μF]. However, in a high-frequency region over 10 [kHz], a difference in capacitance that depends on etching pit lengths becomes smaller at higher frequencies.

At a high frequency of 100 [kHz], the averages of the capacitance in Example 1, Comparative Example 1, Comparative Example 2, Comparative Example 3, and Comparative Example 4 are 0.97 [μF], 1.09 [μF], 1.05 [μF], 1.07 [μF], and 1.00 [μF], respectively. In other words, even though the etching pit length in Example 1 is 27 [μm] and is short, the capacitance in Example 1 and the capacitance in Comparative Examples 1 to 4 are about 1.0 [μF] in the high-frequency region of 100 [kHz].

At a high frequency of 120 [kHz], the averages of the capacitance in Example 1, Comparative Example 1, Comparative Example 2, Comparative Example 3, and Comparative Example 4 are 0.90 [μF], 1.01 [μF], 0.98 [μF], 0.99 [μF], and 0.93 [μF], respectively. Even though the etching pit length in Example 1 is 27 [μm] and is short, the capacitance in Example 1 and the capacitance in Comparative Examples 1 to 4 are about 0.95 [μF] at the frequency of 120 [kHz], which indicates that Example 1 is comparable to Comparative Examples 1 to 4 in capacitance.

In other words, in a high-frequency region of 100 [kHz] or more, even though the etching pit in Example 1 is 27 [μm] and is short, the capacitance in Example 1 and the capacitance in Comparative Examples 1 to 4 are substantially equal to each other. This result shows that, in the high-frequency region of 100 [kHz] or more, it is possible to charge and discharge efficiently in the whole range of an etching pit with an etching pit length of 27 [μm] or less. Conversely, the result shows that charging and discharging are not performed sufficiently at a deep part of a pit over 27 [μm] and that the deep part of the pit does not contribute to generation of capacitance.

Accordingly, an electrode foil with an etching pit length of 27 [μm] or less enables reduction of a foil thickness while ensuring a thickness of a residual core required for maintaining good strength of an electrode foil. For example, in regard to an electrolytic capacitor including a wound capacitor element, it is possible to reduce the capacitor element in size and to increase the number of windings of an electrode foil. When using a multilayer capacitor element, it is possible to increase the number of layers in an electrode foil as well as to reduce the capacitor element in size, leading to an increase in capacitance.

Examples 2 to 4

Anode foils of capacitor elements of Examples 2, 3, and 4 were electrode foils with etching pit lengths of 20 [μm], 12 [μm], and 6 [μm], respectively. The capacitor elements of Examples 2, 3, and 4 were prepared by a similar production method and under similar conditions to that of Example 1.

<Second Measurement of Capacitance>

Figure 18B:
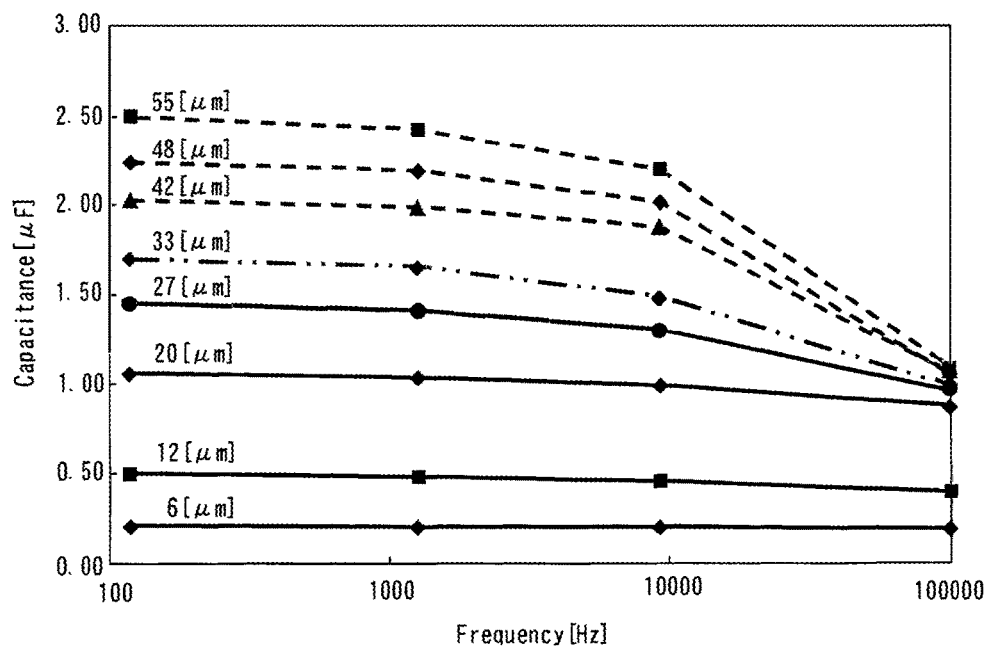
FIG. 18B is a view illustrating frequency dependence of capacitance depending on electrode foils with different pit lengths.

Capacitance of the capacitor elements of Examples 2 to 4 were measured under similar conditions to that in Example 1 and Comparative Examples 1 to 4. FIG. 18B illustrates results of the measurement and the averages in Example 1 and Comparative Examples 1 to 4. In the graph illustrated in FIG. 18B, the measurement results in Examples 1 to 4 and Comparative Examples 1 to 4 are plotted in a frequency range from 100 [Hz] to 100 [kHz].

Figure 19:
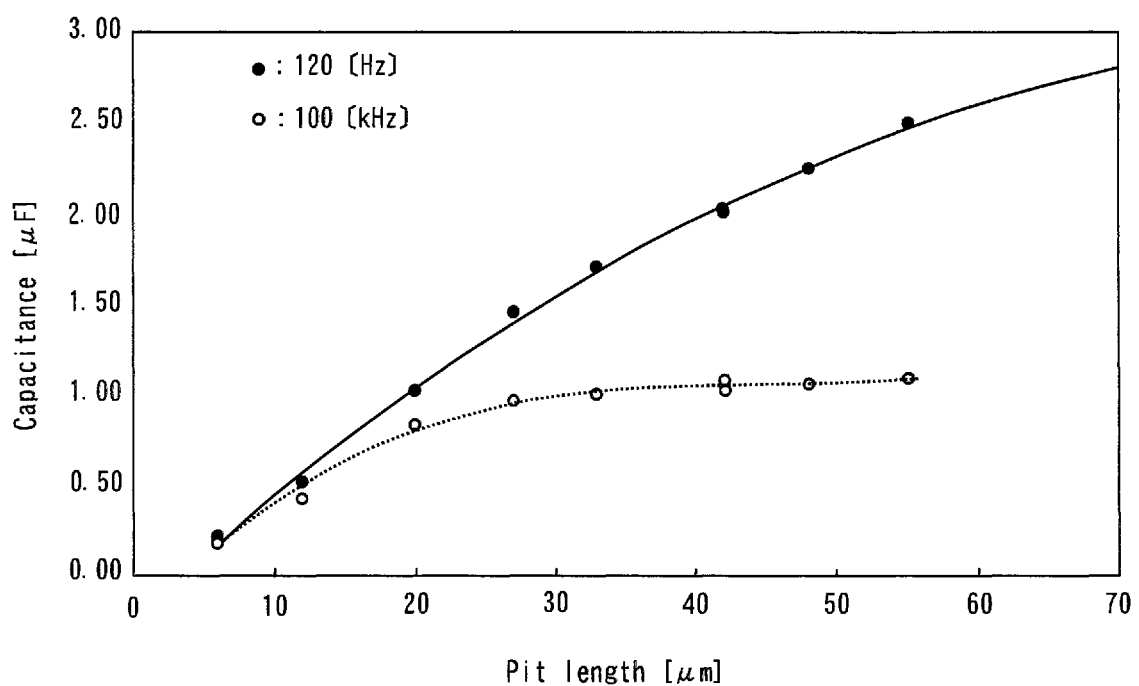
FIG. 19 is a view illustrating a relation between pit lengths and capacitance when frequencies are set to 120 [Hz] and 100 [kHz] as parameters.

FIG. 19 illustrates a relation between capacitance and etching pit lengths at each AC current when AC currents at a frequency of 120 [Hz] and at a frequency of 100 [kHz] were each applied to each of the capacitor elements of Examples 1 to 4 and Comparative Examples 1 to 4.

When an etching pit length is 6 [μm], the capacitance does not change at frequencies from 1 [Hz] to 100 [kHz]. When an etching pit length is 12 [μm], the capacitance in a high-frequency region starts to decrease slightly, causing a difference between the capacitance at the frequency of 120 [Hz] and the capacitance at the frequency of 100 [kHz].

When an etching pit length is 20 [μm] (about 1.6 times the 12 [μm] etching pit length), the capacitance at the frequency of 100 [kHz] is 0.83 [μF]. This value corresponds to approximately twice the capacitance at the frequency of 100 [kHz], which is 0.42 [μF], when the etching pit length is 12 [μm].

When an etching pit length is 27 [μm] (about 2.25 times the 12 [μm] etching pit length), the capacitance at the frequency of 100 [kHz] is 0.97 [μF]. This value corresponds to approximately 2.3 times the capacitance at the frequency of 100 [kHz], which is 0.42 [μF], when the etching pit length is 12 [μm].

Accordingly, when an etching pit length is 12 [μm] or more and 20 [μm] or less, a rate of increase in capacitance that depends on etching pit lengths starts to slow down, but the capacitance depending on etching pit lengths is obtained efficiently.

When an etching pit length is over 20 [μm] and 27 [μm] or less, the rate of increase in capacitance depending on etching pit lengths slows down, but the capacitance increases as compared with a case where an etching pit length is over 27 [μm]. Therefore, in order to efficiently enhance the capacitance that depends on etching pit lengths, an etching pit length is preferably from 12 [μm] to 20 [μm], and in order to enhance strength and capacitance of an electrode foil, an etching pit length is preferably over 20 [μm] and 27 [μm] or less.

In each of Examples 1 to 4, a current at a frequency of 100 [kHz] is applied, but the present invention is not limited to the frequency and the current. Even when a voltage or a current that has a high-frequency component waveform at a frequency of 100 [kHz] or more and a low-frequency component waveform at a frequency below 100 [kHz] is applied to an electrode foil, it is possible to obtain similar effects to those obtained in Examples.

An electrolytic capacitor having such effects is applicable to a high-frequency circuit that uses a switching frequency of the aforementioned power semiconductor such as a converter or an inverter, and the electrolytic capacitor contributes to high efficiency and downsizing of the power converter.

As is clear from Examples, making a pit length of an electrode foil longer than necessary deteriorates responsiveness in a high-frequency region. In a deep part of an etching pit, a charging rate in a high-frequency region is extremely lower than that in a part close to a pit opening, and it is difficult to charge and discharge normally. Accordingly, a deep part of an etching pit does not function as an effective capacitance component.

In addition, an electrolytic capacitor in the related art including an electrode foil having etching pits with a long pit length is inconvenient due to its low capacitance density in a high-frequency region. Accordingly, in an electrolytic capacitor for uses at high frequencies, it is desirable to employ an electrode foil with an optimal length for uses at high frequencies.

Effects of Examples

According to Examples, the following effects are obtained.

(1) The electrolytic capacitors according to Examples are applicable to a high-frequency circuit that uses a switching frequency of the aforementioned power semiconductor such as a converter or an inverter, and enable high efficiency and downsizing of the power converter.

(2) The use of an electrode foil having an optimum pit length in a high-frequency region enables an electrolytic capacitor with excellent capacitor performance in the high-frequency region, leading to downsizing and enhancement in ripple current capability of the electrolytic capacitor.

(3) All the etching pits in the electrolytic capacitor 4-1 have a depth that contributes to capacitance. Accordingly, it is possible to reduce a thickness while leaving a sufficient amount of residual core. Furthermore, it is possible to enhance capacitance per unit volume of the electrolytic capacitor while maintaining strength of an electrode foil.

(4) In regard to the etching pits formed in the electrode foils of the electrolytic capacitors 4-1 and 4-2, for example, it is supposed that a current including a low-frequency component at a frequency of 120 [Hz] and a high-frequency component at a frequency of 100 [kHz] is applied to a parallel circuit having two electrolytic capacitors each including an electrode foil with a pit length of 55 [μm]. In this case, capacitance that depends on pit lengths is extracted from the electrolytic capacitors in a region at 120 [Hz], but capacitance extracted in a region at 100 [kHz] is smaller than that corresponding to the pit length.

Accordingly, one of the two electrolytic capacitors including the electrode foils with a pit length of 55 [μm] is changed to an electrolytic capacitor including an electrode foil with a pit length of 27 [μm]. In other words, one electrolytic capacitor includes an electrode foil with a pit length of 55 [μm], and the other electrolytic capacitor includes an electrode foil with a pit length of 27 [μm]. It is assumed that a parallel circuit is provided with at least two types of electrolytic capacitors with different etching pit lengths and that a current including a low-frequency component at a frequency of 120 [Hz] and a high-frequency component at a frequency of 100 [kHz] is applied to the parallel circuit.

In an electrolytic capacitor including an electrode foil with a pit length of 55 [μm], much capacitance is extracted in a region at 120 [Hz]. However, in a deep part of the pit length, capacitance in a region at 100 [kHz] is not utilized, and the capacitance to be extracted becomes small.

On the other hand, in an electrolytic capacitor including an electrode foil with a pit length of 27 [μm], even though the number of windings of the electrode foil is increased due to a small thickness of the electrode foil, it is possible to employ a capacitor element having a diameter similar to that of an electrolytic capacitor including an electrode foil with a pit length of 55 [μm]. In other words, capacitance is expected to increase due to an increase in an amount of an electrode foil to be mounted. So, in a region at 100 [kHz], it is possible to extract more capacitance from an electrolytic capacitor including an electrode foil with a pit length of 27 [µm] than from an electrolytic capacitor including an electrode foil with a pit length of 55 [µm].

In other words, even in a frequency region where capacitance cannot be extracted from an electrolytic capacitor including an electrode foil with a pit length of 55 [µm], an electrolytic capacitor including an electrode foil with a pit length of 27 [µm] supplements capacitance in the frequency region. Accordingly, in at least two electrolytic capacitors with etching pits in an electrode foil, the use of at least two types of electrolytic capacitors with different etching pit lengths, that is, the combined use of electrolytic capacitors having different frequency ranges that efficiently extract capacitance, offers efficient capacitance and a small size to a power converter that uses a current and a voltage including different frequency components. Therefore, it is possible to downsize the power converter and to promote efficiency of the power converter.

As described above, the best embodiment etc. of the present invention have been described. The present invention is not limited to the above description. Various modifications and variations may be made by those skilled in the art based on the gist of the invention disclosed in the claims or described in the description of embodiments. It goes without saying that such modifications and variations are included in the scope of the present invention.

INDUSTRIAL APPLICABILITY

According to a configuration of the present disclosure, two types of electrolytic capacitors with different etching pit lengths are used in combination, which makes it possible to take advantage of features of each electrolytic capacitor according to frequency regions, to enable efficient capacitor functions in a wide frequency region from a low frequency to a high frequency, and to contribute to downsizing of a filter circuit and a power converter.

REFERENCE SIGNS LIST

2 Electrolytic capacitor module
4-1 First electrolytic capacitor
4-2 Second electrolytic capacitor
6 Casing
8, 10 External terminal
12 Resistor
14 Filter circuit
16 Power source
18, 30, 40 Power converter
20 Converter
22 Battery
24 Inductor
26, 36 Switching element
28-1, 28-2, 50-1, 50-2 Output terminal
32 Inverter
34-1, 34-2 Input terminal
38 Motor
42 Smoothing unit
44 Rectifying unit
46 Waveform adjusting unit
48 Solar panel
52 Etching pit
54 Equivalent circuit model
56 Current pulse source
58 Electrolytic capacitor cell
60-1, 60-2 Electrode foil
62-1, 62-2, 62-3 Lead
64-1, 64-2 Separator
66-1, 66-2 Glass plate

The invention claimed is:

1. An electrolytic capacitor module comprising at least two types of electrolytic capacitors with different etching pit lengths of tunnel-like etching pits, wherein the electrolytic capacitors are connected in parallel, wherein
the at least two types of electrolytic capacitors each include a capacitor element with a wound electrode foil and an electrolyte consisting of a liquid electrolytic solution,
a first type electrolytic capacitor is an electrolytic capacitor with an etching pit length of 27 [µm] or less, and
a second type electrolytic capacitor is an electrolytic capacitor with an etching pit length over 27 [µm],
an electrode foil of the first type electrolytic capacitor is thinner than an electrode foil of the second type electrolytic capacitor, and
a number of windings of the electrode foil of the first type electrolytic capacitor is larger than a number of windings of the electrode foil of the second type electrolytic capacitor.

2. A filter circuit comprising an electrolytic capacitor module that includes at least two types of electrolytic capacitors with different etching pit lengths of tunnel-like etching pits, wherein the electrolytic capacitors are connected in parallel, wherein
the at least two types of electrolytic capacitors each include a capacitor element with a wound electrode foil and an electrolyte consisting of a liquid electrolytic solution,
a first type electrolytic capacitor is an electrolytic capacitor with an etching pit length of 27 [µm] or less, and
a second type electrolytic capacitor is an electrolytic capacitor with an etching pit length over 27 [µm],
an electrode foil of the first type electrolytic capacitor is thinner than an electrode foil of the second type electrolytic capacitor, and
a number of windings of the electrode foil of the first type electrolytic capacitor is larger than a number of windings of the electrode foil of the second type electrolytic capacitor.

3. A power converter comprising a filter circuit provided with an electrolytic capacitor module that includes at least two types of electrolytic capacitors with different etching pit lengths of tunnel-like etching pits, wherein the electrolytic capacitors are connected in parallel, wherein
the at least two types of electrolytic capacitors each include a capacitor element with a wound electrode foil and an electrolyte consisting of a liquid electrolytic solution,
a first type electrolytic capacitor is an electrolytic capacitor with an etching pit length of 27 [µm] or less, and
a second type electrolytic capacitor is an electrolytic capacitor with an etching pit length over 27 [µm],
an electrode foil of the first type electrolytic capacitor is thinner than an electrode foil of the second type electrolytic capacitor, and
a number of windings of the electrode foil of the first type electrolytic capacitor is larger than a number of windings of the electrode foil of the second type electrolytic capacitor.

* * * * *